(12) United States Patent  
Nitzke et al.

(10) Patent No.: US 7,174,713 B2
(45) Date of Patent: Feb. 13, 2007

(54) METHOD FOR DETERMINATION OF COMPOSITION OF THE GAS MIXTURE IN A COMBUSTION CHAMBER OF AN INTERNAL COMBUSTION ENGINE WITH EXHAUST GAS RECIRCULATION AND CORRESPONDINGLY CONFIGURED CONTROL SYSTEM FOR AN INTERNAL COMBUSTION ENGINE

(75) Inventors: Hans-Georg Nitzke, Wettmershagen (DE); Thorsten Rebohl, Braunschweig (DE); Jens Jeschke, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 101 days.

(21) Appl. No.: 10/850,531

(22) Filed: May 20, 2004

(65) Prior Publication Data

US 2007/0012040 A1    Jan. 18, 2007

Related U.S. Application Data

(63) Continuation of application No. PCT/EP02/12580, filed on Nov. 11, 2002.

(30) Foreign Application Priority Data

| Nov. 28, 2001 | (DE) | ................................ 101 58 247 |
| Nov. 28, 2001 | (DE) | ................................ 101 58 249 |
| Nov. 28, 2001 | (DE) | ................................ 101 58 250 |
| Nov. 28, 2001 | (DE) | ................................ 101 58 261 |
| Nov. 28, 2001 | (DE) | ................................ 101 58 262 |

(51) Int. Cl.
*F02B 33/44* (2006.01)
*F02M 25/07* (2006.01)
*G01M 19/00* (2006.01)
*F02B 47/08* (2006.01)

(52) U.S. Cl. ............................... 60/605.2; 123/568.21; 123/568.22; 701/108; 701/103; 73/118.1; 73/118.2

(58) Field of Classification Search ................ 701/108, 701/101–103; 73/118.2, 118.1; 123/568.21, 123/568.22, 698, 673; 60/605.2
See application file for complete search history.

(56) References Cited

U.S. PATENT DOCUMENTS 5,553,575 A * 9/1996 Beck et al. ............... 123/198 F (Continued)

FOREIGN PATENT DOCUMENTS

DE    44 17 199 A1    11/1994

(Continued)

*Primary Examiner*—Thai-Ba Trieu
(74) *Attorney, Agent, or Firm*—Baker Botts L.L.P.

(57) ABSTRACT

An engine management system uses physically based models to determine the composition and mass of the fresh air/exhaust gas mixture suctioned by an internal combustion engine. The models are closely coupled to each other in a partial manner and are used to simulate the filling of the combustion chamber with the suctioned fresh air/waste gas mixture in order to simulate the flow of the mass of re-circulating exhaust gas, the behavior of the exhaust gas manifold upstream and downstream from a turbine, the storage behavior of the intake manifold, and the behavior of the intake pipe or inlet manifold whereby the fresh air/exhaust gas mixture is fed to the combustion engine from a corresponding mixing point where the suctioned fresh air is mixed with the exhaust gas re-circulated via the exhaust gas re-circulation line. As a result, a plurality of additional state variables can be determined without additional sensors.

72 Claims, 4 Drawing Sheets

U.S. PATENT DOCUMENTS

| | | | |
|---|---|---|---|
| 5,714,683 A | 2/1998 | Maloney | 73/118.2 |
| 5,931,140 A * | 8/1999 | Maloney | 701/103 |
| 5,941,927 A * | 8/1999 | Pfitz | 73/118.2 |
| 5,974,870 A * | 11/1999 | Treinies et al. | 73/118.2 |
| 6,035,639 A | 3/2000 | Kolmanovsky et al. | 60/605.2 |
| 6,109,249 A * | 8/2000 | Wild et al. | 123/568.21 |
| 6,115,664 A | 9/2000 | Cullen et al. | 73/118.2 |
| 6,352,065 B1 * | 3/2002 | Wild et al. | 701/108 |
| 6,422,202 B1 * | 7/2002 | Wild | 73/118.2 |
| 6,564,785 B2 * | 5/2003 | Iwasaki | 73/118.2 |
| 6,588,261 B1 * | 7/2003 | Wild et al. | 73/118.2 |
| 6,651,492 B2 * | 11/2003 | Kolmanovsky et al. | 73/118.2 |
| 6,738,707 B2 * | 5/2004 | Kotwicki et al. | 701/108 |
| 6,871,134 B2 * | 3/2005 | Lange et al. | 701/108 |
| 2003/0106368 A1* | 6/2003 | Osaki et al. | 73/118.2 |
| 2005/0211233 A1* | 9/2005 | Moulin et al. | 123/673 |

FOREIGN PATENT DOCUMENTS

| | | |
|---|---|---|
| DE | 43 21 413 A1 | 1/1995 |
| DE | 44 42 679 A1 | 6/1995 |
| DE | 197 40 914 A1 | 10/1998 |
| DE | 197 40 917 A1 | 10/1998 |
| DE | 197 39 901 A1 | 3/1999 |
| DE | 197 53 873 A1 | 6/1999 |
| DE | 198 44 637 C1 | 10/1999 |
| DE | 199 36 595 C1 | 8/2000 |
| DE | 199 38 260 A1 | 2/2001 |
| DE | 100 40 613 A1 | 3/2001 |
| DE | 199 006 A1 | 3/2001 |
| DE | 199 63 358 A1 | 7/2001 |
| EP | 1 020 624 A2 | 7/2000 |
| EP | 1 079 090 A2 | 8/2000 |
| EP | 1 091 106 A2 | 9/2000 |
| WO | WO97/35106 | 9/1997 |
| WO | WO99/14476 | 3/1999 |
| WO | WO01/29386 | 4/2001 |

* cited by examiner

METHOD FOR DETERMINATION OF COMPOSITION OF THE GAS MIXTURE IN A COMBUSTION CHAMBER OF AN INTERNAL COMBUSTION ENGINE WITH EXHAUST GAS RECIRCULATION AND CORRESPONDINGLY CONFIGURED CONTROL SYSTEM FOR AN INTERNAL COMBUSTION ENGINE

CROSS REFERENCE TO RELATED APPLICATION

This application is a continuation of copending International Application No. PCT/EP02/12580 filed Nov. 11, 2002 which designates the United States, and claims priority to German application no. 101 58 262.5 filed Nov. 28, 2001, German application no. 101 58 247.1 filed Nov. 28, 2001, German application no. 101 58 261.7 filed Nov. 28, 2001, German Application No. 101 58 250.1 filed Nov. 28, 2001, and German Application No. 101 58 249.8 filed on Nov. 28, 2001.

TECHNICAL FIELD OF THE INVENTION

The present invention concerns a method for determination of the composition of the gas mixture in a combustion chamber of an internal combustion engine with exhaust gas recirculation, as well as a correspondingly configured control system in the internal combustion engine, for example, a diesel engine.

DESCRIPTION OF THE RELATED ART

Precise knowledge of the mass and composition of the admitted gas mixture, i.e., the fresh air/exhaust mixture, in the engine combustion chamber is of decisive importance for emission-optimal control of a supercharged diesel engine with exhaust gas recirculation.

In known concepts, the fresh air mass in the combustion chamber of the internal combustion engine is determined from measurement of the fresh air mass flow via a hot film air mass sensor very far forward in the intake path of the internal combustion engine. Because of the fresh air storage behavior of the intake line, this determination of the fresh air mass is beset with errors in the dynamic engine operating phases. Moreover, this type of sensor signal cannot used to calculate the exhaust mass situated in the combustion chamber, which is returned via exhaust gas recirculation of the internal combustion engine and mixed with the admitted fresh air at an exhaust gas recirculation mixing site. In the ordinary concepts, this quantity therefore cannot be determined.

SUMMARY OF THE INVENTION

The underlying task of the present invention is therefore to propose a method for determination of the composition of the gas mixture in a combustion chamber of an internal combustion engine with exhaust gas recirculation, as well as a correspondingly configured control system for an internal combustion engine, with which an exact determination of the composition of the gas mixture in the combustion chamber of the internal combustion engine is possible with the simplest possible means, i.e., exact determination of the fresh air and exhaust gas mass, especially in the dynamic engine operating phases.

This task can be solved by a method for determination of the composition of the gas mixture in a combustion chamber of an internal combustion engine with exhaust gas recirculation, comprising the steps of:
mixing fresh air with the exhaust of an internal combustion engine recirculated via the exhaust gas recirculation and a mixing site,
feeding the gas mixture resulting from it to the combustion chamber of the internal combustion engine, and
determining the composition of the gas mixture in the combustion chamber of the internal combustion engine by determination of corresponding state quantities of the internal combustion engine by using corresponding physically based models that simulate the behavior of the internal combustion engine with reference to the state quantity being determined.

The composition and mass of the gas mixture in the combustion chamber of the internal combustion engine can be determined by using the physically based models. The filling of the combustion chamber of the internal combustion engine can be simulated with a model by the gas mixture fed from the mixing site. By means of the model, the total mass of the gas mixture in the combustion chamber of the internal combustion engine can be determined as a function of the pressure and temperature of the gas mixture in front of the internal combustion engine. The total mass of the gas mixture in the combustion chamber of the internal combustion engine can be determined by means of a linear approach as a function of the pressure and temperature of the gas mixture in front of the internal combustion engine, using coefficients that are dependent on the speed of the internal combustion engine. The coefficients can be determined by quadratic polynomials as a function of the speed of the internal combustion engine. The coefficients can be determined by means of characteristics that are dependent on the speed of the internal combustion engine. During determination of the total mass as a function of the pressure and the temperature in front of the internal combustion engine, a correction factor can be used in the linear approach for adaptation models to the actual behavior of internal combustion engine. The correction factor can be adjusted as a function of the difference between a measured pressure of the fresh air and a pressure of the fresh air, determined by means of another physically based model. The total gas mass flow of the gas mixture in the combustion chamber of the internal combustion engine can be determined from the total mass by means of model. The fresh air mass flow and the exhaust gas recirculation mass flow in the combustion chamber of the internal combustion engine can be determined as a function of the total gas mass flow in the combustion chamber of the internal combustion engine, with consideration of an exhaust gas recirculation rate. An air ratio in the combustion chamber of internal combustion engine can be determined from the fresh air mass in the combustion chamber of internal combustion engine and a fuel mass injected into a combustion chamber of the internal combustion engine. By means of a physically based model, the exhaust gas recirculation mass flow flowing to mixing site via the exhaust gas recirculation can be simulated. The exhaust gas recirculation mass flow can be determined as a function of a flow characteristic, an effective cross sectional surface of an exhaust recirculation valve contained in the exhaust gas recirculation, a gas constant, as well as an exhaust gas counterpressure and a temperature of the recirculated exhaust in front of the exhaust gas recirculation valve. The temperature trend of the exhaust recirculated via the exhaust gas recirculation can be simulated by means of model and the temperature of the recirculated exhaust in front of the exhaust gas recirculation valve is derived from it. The exhaust gas recirculation mass flow can be determined as follows from the effective cross sectional surface of the exhaust gas recirculation valve, the exhaust gas counterpressure, the temperature, the gas constant and the flow characteristic:

$$dm_{AGR} = A_{Agr} \cdot p_{AGR} \cdot \frac{2}{\sqrt{R \cdot T_{AGR}}} \cdot DF,$$

in which, for the case, in which the exhaust gas recirculation mass flow flows from an intake line of the internal combustion engine to an exhaust line of the internal combustion engine, the charge pressure of the fresh air in the intake line is used as value for the exhaust counterpressure and the charge temperature of the fresh air of the intake line is used as value for temperature. The effective cross sectional surface of the exhaust gas recirculation valve can be adjusted as a function of a comparison between a measured charge pressure, with which the fresh air is fed to mixing site, and a charge pressure, modeled by means of an initial model, using a corresponding correction factor. The flow characteristic can be derived from the pressure ratio over the exhaust gas recirculation valve. By means of a physically based model, the behavior of an exhaust line of the internal combustion engine, before and after a turbine connected to internal combustion engine, can be simulated. To determine the exhaust counterpressure in front of turbine, the blade path of turbine can be measured or derived from a control pulse duty factor of an adjustment element, provided to adjust the blades of turbine. By means of model, an exhaust gas temperature in front of turbine can be determined as a function of the fuel mass injected in the combustion chamber of internal combustion engine and the speed of internal combustion engine. For determination of exhaust gas temperature in front of turbine, a temperature change, referred to the temperature of the gas mixture between the mixing site and the internal combustion engine, can be determined as a function of the injected fuel mass and the speed of the internal combustion engine. The temperature change can be corrected as a function of a feed start of the fuel to be injected into the combustion chamber of internal combustion engine. An exhaust gas mass flow, ejected by internal combustion engine, can be derived by means of model from a total mass flow fed to the combustion chamber of internal combustion engine of the gas mixture and a fuel mass injected into the combustion chamber of internal combustion engine. By means of model, an exhaust gas mass flow flowing through turbine can be determined from the exhaust gas mass flow ejected by the internal combustion engine and from exhaust gas recirculation mass flow flowing through the exhaust gas recirculation. By means of model, a speed of an exhaust gas turbo-supercharger shaft connected to the turbine and a compressor connected to the internal combustion engine can be determined as a function of a fresh air mass flow flowing through the compressor and a pressure ratio over the compressor. For determination of the pressure ratio over compressor, a pressure in front of compressor can be determined from the atmospheric pressure, a measured fresh air mass flow and an atmospheric temperature, as well as a pressure after the compressor from a charge pressure, with which the fresh air is fed to the mixing site from compressor, the measured fresh air mass flow and a charge temperature, with which the fresh air is fed to the mixing site from compressor. The fresh air mass flow flowing through compressor can be determined from the measured fresh air mass flow and the pressure in front of the compressor by means of a normalization, referred to the atmospheric temperature and a reference temperature of compressor. By means of model, an exhaust gas temperature, after turbine, can be determined as a function of an exhaust gas temperature in front of turbine, a temperature change over turbine and a turbine efficiency. The temperature change over turbine can be determined as a function of a pressure ratio over turbine. The efficiency of the turbine can be determined as a function of a blade path of turbine. The exhaust gas temperature after turbine can be determined as follows, as a function of the exhaust gas temperature in front of turbine, the temperature change over turbine and the efficiency of turbine: $T_{nT} = T_{vT} \cdot (1 - \Delta T_T \cdot \eta_T)$. An exhaust gas counterpressure behind turbine can be derived by means of model from a pressure difference value that denotes the difference between the exhaust gas counterpressure behind the turbine and an atmospheric pressure. The pressure difference value can be determined as a function of exhaust gas mass flow through turbine. The pressure difference value can be determined as a function of the exhaust gas mass flow through the turbine has been corrected by multiplication by means of a factor that corresponds to the square root of exhaust gas temperature after turbine. The exhaust gas counterpressure behind the turbine can be determined by addition of the pressure difference value with the atmospheric pressure. By means of an exhaust gas counterpressure sensor, a pressure difference in the exhaust line behind the turbine can be measured, in which the exhaust gas counterpressure behind the turbine is determined by addition of the pressure difference measured by the exhaust gas counterpressure sensor with the first-named pressure difference value and atmospheric pressure. An exhaust gas counterpressure in front of turbine can be determined from an exhaust gas counterpressure after turbine, an exhaust gas mass flow flowing through turbine, a blade path of turbine and a speed of an exhaust gas turbo-supercharger shaft coupled to turbine. The exhaust gas counterpressure in front of turbine can be determined from the exhaust gas counterpressure after the turbine, the exhaust gas mass flow through the turbine, the blade path of turbine and the speed of the exhaust gas turbo-supercharger shaft, as follows:

$p_{vT} = Z \cdot p_{nT}$ with $Z = b_0 + b_1 \cdot dm_T + b_2 \cdot (s - 0.5)$ $+ b_3 \cdot s^2 + b_4 \cdot (n_{ATL} - 0.5)^2$ $+ b_5 \cdot (dm_T + 0.5) \cdot (s + 0.5)$ $+ b_6 \cdot (dm_T - 0.5) \cdot s^2$ $+ b_7 \cdot (s - 1) \cdot (n_{ATL} - 0.5)^2$ $+ b_8 \cdot (s - 1) \cdot (s - 0.5)^2$ $+ b_9 \cdot (dm_T - 1)^2$ $+ b_{10} \cdot (dm_T - 1) \cdot (dm_T + 0.5)^2 \cdot dm_T$ $+ b_{11} \cdot [(dm_T - 1) \cdot (s - 0.5)^3 - 0.5] \cdot b_{12}$ $+ b_{13}$, in which $b_0$–$b_{13}$ denotes coefficients. By means of model, an exhaust gas counterpressure of the exhaust recirculated via the exhaust gas recirculation can be determined as a function of an exhaust gas recirculation mass flow flowing through the exhaust gas recirculation, an exhaust gas temperature in front of turbine and an exhaust gas counterpressure of the exhaust ejected by the internal combustion engine in front of turbine. The exhaust gas counterpressure in the exhaust gas recirculation line can be determined as follows as a function of exhaust gas counterpressure in front of turbine, the exhaust gas recirculation mass flow in the exhaust gas recirculation line and the exhaust gas temperature in front of turbine:

$$p_{AGR} = p_{vT} - \left(dm_{AGR}^2 \cdot T_{vT} \cdot \frac{PF}{p_{vT}}\right)$$

in which PF denotes an exhaust gas counterpressure constant. The exhaust gas counterpressure constant can be determined as a function of an effective cross sectional surface of the exhaust gas recirculation line. The exhaust gas counterpressure constant can be derived as follows from the gas constant and the effect of cross sectional surface of the exhaust gas recirculation line:

$$PF = \frac{R}{A_{eff}^2}.$$

By means of a physically based model, the storage behavior of an intake line of internal combustion engine can be simulated between a compressor connected to internal combustion engine and a mixing site. The storage behavior of the intake line can be simulated by modeling a storage volume for the fresh air admitted by the intake line with a subsequent throttle site with a specific effective cross sectional surface. A fresh air mass flow flowing to mixing site through the intake line can be determined as a function of a temperature and a pressure of the fresh air, as well as the effective cross sectional surface of the throttle site. The fresh air mass flow can be determined as follows as a function of the temperature of the fresh air, the pressure of the fresh air, the effective cross sectional surface of the throttle site and a flow characteristic:

$$dm_L = A_{dr} \cdot p_{lad\,mod} \cdot \frac{2}{\sqrt{R \cdot T_{lad}}} \cdot DF.$$

The pressure of the fresh air can be determined as a function of a fresh air mass situated between the compressor and mixing site and the temperature of the fresh air. The pressure of the fresh air can be determined as follows, as a function of the fresh air mass, the storage volume and the temperature of the fresh air:

$$p_{lad\,mod} = m_{lad} \cdot \frac{R}{V_L} \cdot T_{lad}$$

in which R denotes a gas constant. The fresh air mass can be determined by time integration of a fresh air mass flow difference between the fresh air mass flow flowing into compressor and the fresh air mass steam flowing from compressor to mixing site. By means of a model, the behavior of a connection leading from mixing site to the internal combustion engine, which supplies the combustion chamber of internal combustion engine with the gas mixture from mixing site, can be simulated. A fresh air mass and an exhaust gas mass in the connection can be determined by time integration of the difference between a fresh air mass flow fed to the connection and a fresh air mass steam fed from the connection to the internal combustion engine or by time integration of a difference between an exhaust gas mass flow fed to the connection via the exhaust gas recirculation and an exhaust gas mass flow fed from the connection to the internal combustion engine. The fresh air mass in the connection and the exhaust gas mass in the connection can be determined as follows as a function of the fresh air mass flow fed to the connection, the exhaust gas mass flow fed to the connection, the fresh air mass steam fed from the connection to internal combustion engine and the exhaust gas mass flow fed from the connection to internal combustion engine:

$$m_L = \int_t^{t+T_0} (dm_L - dm_{Lmot}) d\tau \text{ for } dm_{AGR} \geq 0$$

$$m_L = \int_t^{t+T_0} (dm_L - dm_{Lmot} + dm_{AGR}) \text{ for } dm_{AGR} < 0$$

and $$m_{AGR} = \int_t^{t+T_0} (dm_{AGR} - dm_{AGRmot}) d\tau \text{ for } dm_{AGR} \geq 0$$

$$m_{AGR} = \int_t^{t+T_0} -dm_{AGRmot} d\tau \text{ for } dm_{AGR} < 0$$

in which t denotes an integration time and $T_0$ an integration interval. The total gas mass in the connection can be determined by addition of the fresh air mass in the connection and the exhaust gas mass in the connection. By means of model, the pressure prevailing in the connection can be determined from the total gas mass in the connection, a temperature in the connection and a volume of the connection. An exhaust gas recirculation rate can be determined by relating the exhaust gas mass in the connection to the total gas mass in the connection. By means of model, a temperature of the gas mixture fed via the connection to the combustion chamber of internal combustion engine can be determined. A fresh air mass and an exhaust gas mass in the connection can be determined by time integration of the difference between a fresh air mass flow fed to the connection and a fresh air mass steam fed from the connection to the internal combustion engine or by time integration of a difference between an exhaust gas mass flow fed to the connection via the exhaust gas recirculation and an exhaust gas mass flow fed from the connection to the internal combustion engine, and wherein, by means of model, the temperature of the gas mixture fed via the connection to the combustion chamber of internal combustion engine can be determined as a function of the exhaust gas mass in the connection, a temperature of the exhaust gas recirculation mass flow fed via the exhaust gas recirculation, the fresh air mass in the connection and a temperature of the fresh air mass flow fed to the connection. The temperature of the gas mixture in the connection can be determined as follows as a function of the exhaust gas recirculation mass in the connection, the temperature of the exhaust gas recirculation mass flow, the fresh air mass in the connection and the temperature of the supplied fresh air mass flow:

$$T_{sr} = \frac{T_{AGR} \cdot m_{AGR} + T_{lad} \cdot m_L}{m_{AGR} + m_L} \text{ for } m_{AGR} + m_L \neq 0$$

and $$T_{sr} = T_{lad} \text{ for } m_{AGR} + m_L = 0.$$

The temperature of the gas mixture in the connection can be corrected by an amount that depends on the difference between a wall temperature of the connection and the temperature of the gas mixture in the connection, as well as a factor multiplied by it, in which the factor again depends on the speed of the internal combustion engine and a fresh air mass flow fed via the connection to the combustion chamber of the internal combustion engine. The wall temperature of the connection can be derived from a cooling water temperature of the internal combustion engine and a wall heat factor of the connection. The method can be automatically executed by a control device, which is a component of the engine management system of internal combustion engine.

The object can also be achieved by a control system for an internal combustion engine with exhaust gas recirculation, in which fresh air is mixed with an exhaust of the internal combustion engine at a mixing site, recirculated via the exhaust gas recirculation, and the gas mixture resulting from this is fed to a combustion chamber of internal combustion engine, wherein the control system is configured so that, in order to control the internal combustion engine, it automatically determines the composition of the gas mixture in the combustion chamber of internal combustion engine with calculation of corresponding state quantities of internal combustion engine by using corresponding physically based models, which simulate the behavior of internal combustion engine, with reference to the state quantities being calculated.

It is proposed according to the invention, for determination of the composition of the gas mixture in a combustion chamber an internal combustion engine, i.e., for determination of the fresh air and exhaust gas mass in this combustion chamber, to determine corresponding quantities of state of the internal combustion engine by using corresponding physically based models, in which the individual physically based models reproduce the behavior of the internal combustion engine or the engine system with reference to the quantity of state being calculated. In this respect, the fresh air mass flow in the so-called intake manifold of the internal combustion engine can be calculated as quantities of state with consideration of the storage behavior of the intake path, the exhaust gas recirculation mass flow, the pressure and the temperature of the intake gas in front of the intake valves of the internal combustion engine, the pressure and temperature of the exhaust in front of the turbine, etc. The physically based models can also partially be replaced by empirical models, if no real time capable physical model can be determined for the corresponding model.

By means of a first model, filling of the combustion chamber with the fresh air-exhaust gas mixture from the so-called intake manifold can be simulated, i.e., the connection between the exhaust gas recirculation mixing site and the intake valves of the corresponding engine, in order to be able to determine both the fresh air mass flow and the exhaust gas mass flow, as well as the fresh air mass in the combustion chamber and the exhaust gas mass in the combustion chamber of the internal combustion engine.

Exhaust is fed back from the exhaust line to the intake line via the exhaust gas recirculation line of the internal combustion engine. In this respect, an additional model can be used, in order to be able to determine the exhaust gas recirculation mass flow through the exhaust gas recirculation line and the temperature of the returned exhaust in front of the exhaust gas return mixing site. For this purpose, a model approach for a throttle site can be used.

Another model can be used to copy the behavior of the exhaust line before and after the turbine of the engine system. The exhaust gas counterpressure in front of the turbine can be determined as the most important input quantity by means of this model—again with consideration of the corresponding initial and intermediate quantities.

The storage behavior of the intake line between the compressor and the exhaust gas recirculation mixing site can likewise be simulated by means of a corresponding model. In this respect, a model can be used that copies the storage volume for the fresh air and a subsequent throttle site. The fresh air mass flow, through the aforementioned throttle into the intake manifold, i.e., into the engine intake, the stored fresh air mass and the aforementioned storage volume, as well as the model's charge pressure, etc., can be determined as essential input quantities of this model.

The inflowing exhaust gas recirculation mass flow, i.e., the returned exhaust gas mass flow, is mixed in the so-called manifold passage of the internal combustion engine to the fresh air/exhaust mixture, from which the engine takes in its filling. The behavior of this manifold passage can be simulated by means of a corresponding model, in order to calculate the exhaust gas recirculation mass and the fresh air mass in the manifold passage, which can occur, for example, by evaluating the mass flow balances for fresh air and recirculated exhaust.

Another model can be proposed for determination of the manifold passage temperature, i.e., the temperature of the fresh air/exhaust mixture in the manifold passage. The manifold passage temperature in this respect can be determined, especially as a function of the exhaust recirculation mass in the manifold passage and the temperature of the exhaust recirculation mass flow and the fresh air mass in the manifold passage and the temperature of the inflowing fresh air mass flow.

The individual models defined above are partly in a close relation, so that the results of another model can be resorted to, in order to calculate a specific quantity of state in a model. In this case, it is kept in mind that the dependences of the individual quantities described formally in the context of this patent application generally are only supposed to explain the proportional relation, so that normalization or correction factors (not stated) must be considered for further conversion of the corresponding quantities, depending on the corresponding application or implementation.

Overall, the mass and composition of the gas mixture admitted by the combustion chamber of the internal combustion engine, for example, a diesel engine, can be exactly determined by means of the present invention, so that an emission-optimal regulation of the internal combustion engine is possible, based on precise knowledge of the mass and composition of the fresh air mass and exhaust mass in the combustion chamber of the internal combustion engine. A number of quantities of state from information known anyway can then be obtained without using separate or additional sensors, so that new control and regulation strategies are made possible.

In addition, the present invention concerns, in addition to the invention aspects just explained, the following invention aspects, which, in principle, are independent of each other and of the invention aspects just explained. However, a combination of individual or all invention aspects described here is naturally possible.

I. Method for Control of an Internal Combustion Engine with Exhaust Gas Recirculation, as well as Correspondingly Configured Control System for an Internal Combustion Engine Exhaust is returned from the exhaust line to the intake line via the exhaust gas recirculation line of an internal combustion engine. For emission-optimal control or regulation, for example, of a supercharged diesel engine with exhaust gas recirculation, precise knowledge of the largest possible number of quantities of state or operating parameters is of significance.

In ordinary engine management systems, however, the number of recorded or known state quantities is relatively limited, or separate sensors are required to record the state quantities. In particular, this concerns state quantities connected with the exhaust line of internal combustion engines, like the exhaust counterpressure or the exhaust temperature in front of or after the turbine of the corresponding internal combustion engine, etc. These state quantities thus far could be recorded, at best, with separate sensors.

To implement a method for controlling an internal combustion engine with exhaust gas recirculation, as well as a correspondingly configured control system for an internal combustion engine, with which control of the internal combustion engine is possible as a function of state quantities of the exhaust line, determined in the most effective manner possible without requiring additional sensors, a physically based model can be used that simulates the behavior of the exhaust line of the internal combustion engine before and after a turbine connected to the internal combustion engine. By means of this model, different state quantities connected with the exhaust line can be determined from other (already known or recorded anyway) state quantities, so that specific operating parameters dependent on them of the internal combustion engine, like fuel injection amount or fuel injection time, etc., can be controlled or regulated in emission-optimal fashion.

By means of the model, the exhaust counterpressure in front of or after the turbine, the exhaust temperature in front of or after the turbine or the exhaust counterpressure of the exhaust returned via the exhaust gas recirculation line of the internal combustion engine can be determined from already known state quantities without using additional sensors.

Several physically based (or also empirically determined) models are preferably used, which are partly in a close relation, so that the results of another model can be resorted to in calculating specific state quantities in one model. It must be kept in mind that the dependences of the individual quantities formally described here generally is only supposed to explain the proportional relation, so that normalization or correction factors (not stated) must be considered for further conversion of the corresponding quantities as a function of the corresponding application or implementation.

Overall, state quantities of the exhaust line of an internal combustion engine, for example, a diesel engine, can therefore be determined exactly and by simple means by evaluating already known state quantities. The use of additional sensors is not required for this. New control and diagnosis methods within the corresponding engine management system are possible by the possible determination of state quantities of the exhaust line, which permits, for example, emission-optimal regulation of the internal combustion engine.

This invention aspect therefore includes especially the following features:

In a method for controlling an internal combustion engine with exhaust gas recirculation, fresh air is mixed at a mixing site with exhaust of the internal combustion engine, returned via the exhaust gas recirculation, and the gas mixture resulting from this is fed to the combustion chamber of the internal combustion engine, in which the behavior of an exhaust line of the internal combustion engine before and after a turbine connected to the internal combustion engine is simulated by a physically based model, and at least one state quantity connected with the exhaust line is determined by means of the model from at least one additional state quantity, in order to control the internal combustion engine as a function of it.

An exhaust counterpressure can be determined in front of the turbine by means of the model, in which, for this purpose, the blade path of the turbine is measured or derived from a control-pulse duty factor of an adjustment element provided to adjust the blades of the turbine.

By means of the model, an exhaust temperature in front of the turbine can be determined as a function of a fuel mass injected into the combustion chamber of the internal combustion engine and a speed of the internal combustion engine.

A temperature change, referred to the temperature of the gas mixture between the mixing site and the internal combustion engine, can be determined as a function of the injected fuel mass and the speed of the internal combustion engine to determine the exhaust temperature in front of the turbine.

The temperature change can be corrected as a function of a feed start of the fuel to be injected into the combustion chamber of the internal combustion engine.

An exhaust mass flow ejected from the internal combustion engine is derived from a total mass flow of the gas mixture fed to the combustion chamber of the internal combustion engine by means of the model and a fuel mass injected into the combustion chamber of the internal combustion engine.

An exhaust mass flow flowing through the turbine can be determined from the exhaust mass flow ejected from the internal combustion engine and an exhaust gas recirculation mass flow flowing through the exhaust gas recirculation.

By means of the model, a speed of an exhaust turbo-supercharger shaft coupled to the turbine and a compressor connected to the internal combustion engine can be determined as a function of a fresh air mass flow flowing through the compressor and a pressure ratio over the compressor.

To determine the pressure ratio of the compressor, a pressure in front of the compressor can be determined from the atmospheric pressure, a measured fresh air mass flow and an atmospheric temperature, as well as the pressure after the compressor from a charge pressure, with which the fresh air can be fed from the compressor to the mixing site, the measured fresh air mass flow and a charge temperature, with which the fresh air is fed from the compressor to the mixing site.

The fresh air mass flow flowing through the compressor can be determined from the measured fresh air mass flow and the pressure in front of the compressor by means of a normalization, referred to atmospheric temperature and a reference temperature of the compressor.

By means of the model, an exhaust temperature can be determined after the turbine as a function of an exhaust temperature in front of the turbine, a temperature change over the turbine and a turbine efficiency.

The temperature change over the turbine can be determined as a function of a pressure ratio over the turbine.

The efficiency of the turbine is can be determined as a function of a blade path of the turbine.

The exhaust temperature $T_{nT}$ after the turbine can be determined as follows as a function of the exhaust temperature $T_{vT}$ in front of the turbine, the temperature change $\Delta T_T$ over the turbine and the efficiency $\eta_T$ of the turbine: $T_{nT}=T_{vT}\cdot(1-\Delta T_T\cdot\eta_T)$.

An exhaust counterpressure behind the turbine can be derived by means of the model from a pressure difference value, which denotes the difference between the exhaust counterpressure behind the turbine and atmospheric pressure.

The pressure difference value can be determined as a function of an exhaust mass flow through the turbine.

The pressure difference value can be determined as a function of the exhaust gas mass flow through the turbine, after the exhaust gas mass flow through the turbine has been corrected by multiplication by means of a factor that corresponds to the square root of the exhaust temperature after the turbine.

The exhaust counterpressure behind the turbine can be determined by addition of the pressure difference value with atmospheric pressure.

By means of an exhaust counterpressure sensor, a pressure difference can be measured in the exhaust line behind the turbine, in which the exhaust counterpressure behind the turbine is determined by addition of the pressure difference measured by the exhaust counterpressure sensor with the first mentioned pressure difference value and atmospheric pressure.

The exhaust counterpressure in front of the turbine can be determined from an exhaust counterpressure after the turbine, an exhaust gas mass flow flowing through the turbine, a blade path of the turbine and a speed of an exhaust gas turbo-supercharger shaft connected to the turbine.

The exhaust counterpressure in front of the turbine can be determined as follows from the exhaust counterpressure $p_{nT}$ after the turbine, the exhaust gas mass flow $dm_T$ through the turbine, the blade path s of the turbine and the speed $n_{ATL}$ of the exhaust gas turbo-supercharger shaft:

$p_{vT}=Z\cdot p_{nT}$ with $Z=b_0+b_1\cdot dm_T+b_2\cdot(s-0,5)$ $+b_3\cdot s^2+b_4\cdot(n_{ATL}-0,5)^2$ $+b_5\cdot(dm_T+0,5)\cdot(s+0,5)$ $+b_6\cdot(dm_T-0,5)\cdot s^2$ $+b_7\cdot(s-1)\cdot(n_{ATL}-0,5)^2$ $+b_8\cdot(s-1)\cdot(s-0,5)^2$ $+b_9\cdot(dm_T-1)^2$ $+b_{10}\cdot(dm_T-1)\cdot(dm_T+0,5)^2\cdot dm_T$ $+b_{11}\cdot[(dm_T-1)\cdot(s-0,5)^3-0,5]\cdot b_{12}$ $+b_{13}$, in which $b_0$–$b_{13}$ denote coefficients.

By means of the model, an exhaust counterpressure of the exhaust returned via the exhaust gas recirculation can be determined as a function of an exhaust gas recirculation mass flow flowing through the exhaust gas recirculation, an exhaust temperature in front of the turbine and an exhaust counterpressure of the exhaust ejected from the internal combustion engine in front of the turbine.

The exhaust counterpressure $p_{AGR}$ in the exhaust gas recirculation line can be determined as follows as a function of the exhaust counterpressure $p_{vT}$ in front of the turbine, the exhaust gas recirculation mass flow $dm_{AGR}$ in the exhaust gas recirculation line and the exhaust temperature $T_{vT}$ in front of the turbine:

$$p_{AGR} = p_{vT} - \left(dm_{AGR}^2 \cdot T_{vT} \cdot \frac{PF}{p_{vT}}\right),$$

in which PF denotes an exhaust counterpressure constant.

The exhaust gas counterpressure constant can be determined as a function of an effective cross sectional area of the exhaust gas recirculation line.

The exhaust counterpressure constant PF can be derived as follows from the gas constant R and the effective cross sectional surface $A_{eff}$ of the exhaust gas recirculation line: PF=

$$PF = \frac{R}{A_{eff}^2}.$$

The method can be automatically executed by a control device, which is a component of an engine management system of the internal combustion engine.

In a control system for an internal combustion engine with exhaust gas recirculation, in which fresh air is mixed with an exhaust of the internal combustion engine, returned via the exhaust gas recirculation, at a mixing site, and the gas mixture resulting from this is fed to a combustion chamber of the internal combustion engine, the control system is configured so that the behavior of an exhaust line of the internal combustion engine in front of and after a turbine connected to the internal combustion engine is simulated by a physically based model, and by means of model at least one state quantity connected to the exhaust line is automatically determined from at least one additional state quantity and automatically controlled for the internal combustion engine as a function of this.

The control system can be configured to execute the above mentioned method.

II. Additional Method for Controlling the Internal Combustion Engine with Exhaust Gas Recirculation, as well as a Correspondingly Configured Additional Control System for an Internal Combustion Engine Exhaust is returned from the exhaust line into the intake line via the exhaust gas recirculation line of an internal combustion engine and mixed there at a mixing site with fresh air admitted via the intake line. The resulting gas mixture is finally fed to the combustion chambers of the internal combustion engine. For emission-optimal control or regulation, for example, of a supercharged diesel engine with exhaust gas recirculation, precise knowledge of the largest possible number of state quantities or operating parameters is significant.

In ordinary engine management systems, however, the number of recorded or known state quantities is relatively limited, or separate sensors are required for recording of individual state quantities. This also concerns the state quantities connected with the intake line of the corresponding internal combustion engine and especially state quantities that are connected with the so-called manifold passage or intake manifold of the internal combustion engine, i.e., the connection between the exhaust/fresh air mixing site and the engine intake valves, for example, the fresh air or exhaust gas mass, or also the gas temperature in this connection section. These state quantities thus far could be determined with separate sensors, at best.

To implement a method for control of an internal combustion engine with exhaust gas recirculation, as well as a correspondingly configured control system for an internal combustion engine, with which control of the internal combustion engine is possible as a function of state quantities, determined as effectively as possible without requiring additional sensors of this connection between the mixing site and the intake valves of the internal combustion engine, a physically based model can be applied to determine different state quantities, referred to the connection or connection section between the mixing site, at which the return exhaust is mixed with the admitted fresh air, and the intake valves of the internal combustion engine, which simulates the behavior of this connection, in order to be able to control or regulate in emission-optimal fashion automatically the different operating parameters of the internal combustion engine, using this model. By means of the model, the fresh air or exhaust mass in this connection, or also the gas temperature in this connection, can be determined from already known state quantities without using additional sensors, so that specific operating parameters of the internal combustion engine dependent on it, like the fuel injection amount or the fuel injection time, etc., can be controlled or regulated in emission-optimal fashion.

The fresh air mass or exhaust gas mass in the connection can be determined by time integration of a difference between a fresh air mass flow fed to the connection and a fresh air mass flow fed from the connection to the internal combustion engine, or by time integration of a difference between an exhaust gas mass flow fed to the connection via the exhaust gas recirculation, and an exhaust gas mass flow fed from the connection to the internal combustion engine.

The total gas mass situated in the connection can be determined simply by adding the fresh air mass situated in the connection and the exhaust gas mass situated in the connection.

The temperature of the gas mixture fed via the connection to the combustion chambers of the internal combustion engine can be determined as a function of the exhaust gas mass in the connection, a temperature of the exhaust gas recirculation mass flow fed back via the exhaust gas recirculation, the fresh air mass in the connection and a temperature of the fresh air mass flow fed to the connection, in which the temperature value so determined is preferably corrected by an amount that depends on a difference between a wall temperature of the connection and the temperature of the gas mixture in the connection, as well as a factor multiplied by it, in which the factor again depends on the speed of the internal combustion engine and a fresh air mass flow fed via the connection to the combustion chambers of the internal combustion engine. The wall temperature of the connection can be derived for this purpose from a cooling water temperature of the internal combustion engine and a wall heat factor of the connection.

Several physically based (or also empirically determined) models are preferably used, which are partly in a close relation, so that, for calculation of a specific state quantity in one model, the results of another model can preferably be resorted to. It must be kept in mind that the dependences formally described here of the individual quantities generally only explain the proportional relations, so that normalization or correction factors (not stated) are to be considered for further conversion of the corresponding quantities, depending on the corresponding application or implementation.

Overall, state quantities of the intake line or the connection between the mixing site and the intake valves of an internal combustion engine, for example, of a diesel engine, can therefore be determined exactly and with simple means by evaluating already known state quantities. The use of additional sensors is not required for this. Because of the simple possible determination of the corresponding state quantities, new control and diagnosis methods are possible within the engine management system, which permits, for example, emission-optimal control of the internal combustion engine.

This invention aspect therefore includes especially the following features:

In method to control an internal combustion engine with exhaust gas recirculation, fresh air is mixed at a mixing site with an exhaust of the internal combustion engine fed back via the exhaust gas recirculation, and that the gas mixture resulting from this is fed to the combustion chamber of the internal combustion engine, in which case a physically based model simulates the behavior of a connection leading from the mixing site to the internal combustion engine, which supplies the gas mixture to the combustion chamber of the internal combustion engine and, by means of the model, at least one state quantity, referred to this connection, is determined from at least one additional state quantity, in order to control the internal combustion engine as a function of it.

A fresh air mass and/or an exhaust gas mass in the connection can be determined by time integration of a difference between a fresh air mass flow fed to the connection and a fresh air mass flow fed from the connection to the internal combustion engine, or by time integration of a difference between an exhaust gas mass flow fed to the connection via the exhaust gas recirculation and an exhaust gas mass flow fed from the connection to the internal combustion engine.

The fresh air mass $m_L$ situated in the connection and the exhaust gas mass $m_{AGR}$ situated in the connection can be determined as follows, as a function of the fresh air mass flow $dm_L$ fed to the connection, the exhaust gas mass team $dm_{AGR}$ fed to the connection, the fresh air mass flow $dm_{Lmot}$ fed from the connection to the internal combustion engine and the exhaust gas mass flow $dm_{AGRmot}$ fed from the connection to the internal combustion engine:

$$m_L = \int_t^{t+T_0} (dm_L - dm_{Lmot}) d\tau \text{ for } dm_{AGR} \geq 0$$

$$m_L = \int_t^{t+T_0} (dm_L - dm_{Lmot} + dm_{AGR}) \text{ for } dm_{AGR} < 0$$

and $$m_{AGR} = \int_t^{t+T_0} (dm_{AGR} - dm_{AGRmot}) d\tau \text{ for } dm_{AGR} \geq 0$$

$$m_{AGR} = \int_t^{t+T_0} -dm_{AGRmot} d\tau \text{ for } dm_{AGR} < 0,$$

in which t denotes an integration time and $T_0$ an integration interval.

The total gas mass situated in the connection can be determined by addition of the fresh air mass situated in the connection and the exhaust gas mass situated in the connection.

By means of the model, the pressure prevailing in the connection can be determined from the total gas mass situated in the connection, a temperature in the connection and a volume of the connection.

An exhaust gas recirculation rate can be determined by relating the exhaust gas mass situated in the connection to the total gas mass situated in the connection.

By means of the model, a temperature of the gas mixture fed via the connection to the combustion chamber of the internal combustion engine can be determined.

By means of the model, the temperature of the gas mixture fed via the connection to the combustion chamber of the internal combustion engine cacn be determined as a function of the exhaust gas mass in the connection, a temperature of the exhaust gas recirculation mass flow fed back via the exhaust gas recirculation, the fresh air mass in the connection and a temperature of the fresh air mass flow fed to the connection.

The temperature $T_{sr}$ of the gas mixture in the connection can be determined as a function of the exhaust gas recirculation mass $m_{AGR}$ in the connection, the temperature $T_{AGR}$ in the exhaust gas recirculation mass flow, the fresh air mass mL in the connection and the temperature $T_{lsd}$ of the fed fresh air mass flow as follows:

$$T_{sr} = \frac{T_{AGR} \cdot m_{AGR} + T_{lad} \cdot m_L}{m_{AGR} + m_L} \text{ for } m_{AGR} + m_L \neq 0$$

and $$T_{sr} = T_{lad} \text{ for } m_{AGR} + m_L = 0.$$

The temperature of the gas mixture in the connection can be corrected by an amount that depends on a difference between a wall temperature of the connection and the temperature of the gas mixture in the connection, as well as a factor multiplied by it, in which the factor again depends on the speed of the internal combustion engine and a fresh air mass flow fed via the connection to the combustion chamber of the internal combustion engine.

The wall temperature of the connection can be derived from a cooling water temperature of the internal combustion engine and a wall heat factor of the connection.

The method can be automatically executed by a control device, which is a component of an engine management system of the internal combustion engine.

In a control system for an internal combustion engine with exhaust gas recirculation, fresh air is mixed with an exhaust of the internal combustion engine, fed back via the exhaust gas recirculation, at a mixing site, and the gas mixture resulting from this is fed to a combustion chamber of the internal combustion engine, in which the control system is configured so that it simulates, via a physically based model, the behavior of a connection leading from the mixing site to the internal combustion engine, which supplies the gas mixture to the combustion chamber of the internal combustion engine and, by means of the model, automatically determines at least one state quantity, referred to this connection, from at least one additional state quantity and automatically controls the internal combustion engine as a function of it.

The control system can be configured to execute the above mentioned method.

III. Method for Determination of the Fresh Air Mass Flow of an Internal Combustion Engine with Exhaust Gas Recirculation, as well as Correspondingly Configured Control System for an Internal Combustion Engine Precise knowledge of the largest possible number of state quantities or operating parameters is important for emission-optimal regulation, for example, of a supercharged diesel engine with exhaust gas recirculation. Exhaust gas is fed back from the exhaust line to the intake line via the exhaust gas recirculation line of an internal combustion engine and mixed there with admitted fresh air, in order to finally feed the fresh air/exhaust gas mixture to the internal combustion engine.

However, in ordinary engine management systems, the number of recorded or known state quantities is relatively limited, or separate sensors are required to record the individual state quantities. For example, this also concerns different state quantities connected with the intake line of the internal combustion engine, for example, the fresh air mass flow.

To implement a method for determination of the fresh air mass flow of an internal combustion engine with an exhaust gas recirculation, as well as a correspondingly configured control system for an internal combustion engine, with which an exact determination of the fresh air mass flow is possible with the simplest possible means without using a separate sensor, a physically based model can be applied for simulation of the storage behavior of the intake line of the internal combustion engine between the compressor and the mixing site, at which the admitted fresh air is mixed with the returned exhaust, by modeling of a storage volume for the fresh air admitted by the intake line with a subsequent throttle site, in which, to control the internal combustion engine automatically by means of the model, the fresh air mass flow flowing to the mixing site via the intake line is determined.

The fresh air mass flow flowing to the mixing site via the intake line can be determined as a function of the temperature and pressure of the fresh air, as well as the effective cross sectional surface of the throttle site.

The pressure of the fresh air can again be determined as a function of the fresh air mass situated between the compressor and the mixing site and the temperature of the fresh air.

The fresh air mass can be determined by time integration of the fresh air mass flow differences between the fresh air mass flow flowing into the compressor and the fresh air mass flow flowing from the compressor to the mixing site.

According to another practical example, the fresh air mass flow can also be determined as a function of the exhaust turbo-supercharger speed of the internal combustion engine. In addition to the exhaust turbo-supercharger speed, for example, the charge pressure the atmospheric or ambient pressure and the atmospheric or ambient temperature are then included in determination of the fresh air mass flow.

Several physically based (or also empirically determined) models are preferably used, which are partly in a close relation, so that, for calculation of a specific state quantity in one model, the results of another model can be resorted to. It must be kept in mind that the dependences formally described here of the individual quantities generally only explain the proportional relations, so that normalization or correction factors (not stated) for further conversion of the corresponding quantities must be considered as a function of the corresponding application or implementation.

Overall, the fresh air mass flow of an internal combustion engine, for example, a diesel engine, can therefore be determined exactly with simple means by evaluating already known state quantities. The use of additional sensors, especially a hot film-air mass sensor ordinarily required to determine the fresh air mass flow in the intake line, is not necessary for this. By simple possible determination of the exhaust gas recirculation mass flow, new control and diagnosis methods within the corresponding engine management system are therefore possible, which permits, for example, emission-optimal regulation of the internal combustion engine.

This invention aspect therefore includes especially the following features:

In a method for determination of the fresh air mass flow of an internal combustion engine with exhaust gas recirculation, fresh air is mixed with an exhaust of the internal combustion engine fed back via the exhaust gas recirculation at a mixing site, and the gas mixture resulting from this is fed to the combustion chamber of the internal combustion engine, in which, by means of a physically based model, the storage behavior of an intake line of the internal combustion engine is simulated between a compressor connected to the internal combustion engine and the mixing site by modeling of a storage volume for the fresh air admitted by the intake line with a subsequent throttle site and, by means of the model, the fresh air mass flow flowing via the intake line to the mixing site is determined.

The fresh air mass flow flowing to the mixing site via the intake line can be determined as a function of a temperature and a pressure of the fresh air, as well as an effective cross section surface of the throttle site.

The fresh air mass flow $dm_L$ can be determined, as follows, as a function of the temperature $T_{lad}$ of the fresh air, the pressure $p_{ladmod}$ of the fresh air, the effective cross sectional surface $A_{dr}$ of the throttle site and a flow through quantity DF:

$$dm_L = A_{dr} \cdot p_{lad\ mod} \cdot \frac{2}{\sqrt{R \cdot T_{lad}}} \cdot DF.$$

The pressure of the fresh air can be determined as a function of a fresh air mass situated between the compressor and the mixing site and the temperature of the fresh air.

The pressure $p_{ladmod}$ of the fresh air can be determined, as follows, as a function of the fresh air mass $m_{lad}$, the storage volume $V_L$ and the temperature $t_{lad}$ of the fresh air:

$$p_{lad\ mod} = m_{lad} \cdot \frac{R}{V_L} \cdot T_{lad},$$

in which R denotes a gas constant.

The fresh air mass can be determined by time integration of a fresh air mass flow difference between a fresh air mass flow flowing into the compressor and the fresh air mass flow flowing from the compressor to the mixing site.

The method can be automatically executed by a control device, which is a component of an engine management system of the internal combustion engine.

In a method for determination of the fresh air mass flow of an internal combustion engine with exhaust gas recirculation, fresh air is mixed at a mixing site with an exhaust of the internal combustion engine fed back via the exhaust gas recirculation, and the gas mixture resulting from this is fed to the combustion chamber of the internal combustion engine, in which a speed of an exhaust gas turbo-supercharger connected to the internal combustion engine is recorded and the fresh air mass flow flowing through the mixing site is determined from the speed.

The fresh air mass flow can be determined as a function of the speed of the exhaust gas turbo-supercharger, a pressure, with which the fresh air is fed to the mixing site, an atmospheric pressure and an atmospheric temperature.

In a control system for an internal combustion engine with exhaust gas recirculation, fresh air is mixed at a mixing site with an exhaust of the internal combustion engine fed back via the exhaust gas recirculation, and the gas mixture resulting from this is fed to a combustion chamber of the internal combustion engine, in which the control system is configured so that, by means of a physically based model, it simulates the storage behavior of an intake line of the internal combustion engine between a compressor connected to the internal combustion engine and the mixing site by modeling a storage volume for the fresh air admitted by the intake line with a subsequent throttle site and, to control the internal combustion engine, automatically determines the fresh air mass flow flowing to the mixing site via the intake line by means of the model, in order to control the internal combustion engine as a function of it.

The control system can be configured to execute the above mentioned method.

In a control system for an internal combustion engine with exhaust gas recirculation, in which fresh air is mixed at a mixing site with exhaust of the internal combustion engine fed back via the exhaust gas recirculation, and the gas mixture resulting from this is fed to a combustion chamber of the internal combustion engine, the control system is configured so that it determines the fresh air mass flow flowing to the mixing site from a speed of an exhaust gas turbo-supercharger connected to the internal combustion engine, in order to control the internal combustion engine as a function of it.

The control system can be configured so that it determines the fresh air mass flow as a function of the speed of the exhaust gas turbo-supercharger, a pressure, with which the fresh air is fed to the mixing site, an atmospheric pressure and an atmospheric temperature.

IV. Method for Determination of Exhaust Gas Recirculation Mass Flow of an Internal Combustion Engine with Exhaust Gas Recirculation, as well as Correspondingly Configured Control System for an Internal Combustion Engine Precise knowledge of the largest possible number of state quantities or operating parameters is significant for emission-optimal control, for example, of a supercharged diesel engine with exhaust gas recirculation.

However, in ordinary engine management systems, the number of recorded or known state quantities is relatively limited or separate sensors are required for recording the state quantities. This, for example, also concerns the exhaust gas recirculation mass flow flowing via the exhaust gas recirculation line of an internal combustion engine with exhaust gas recirculation. Exhaust is fed back from the exhaust line to the intake line via the exhaust gas recirculation line of an internal combustion engine.

To implement a method for determining the exhaust gas recirculation mass flow of an internal combustion engine with exhaust gas recirculation, as well as a correspondingly configured control system for an internal combustion engine, with which exact determination of the exhaust gas recirculation mass flow is possible with the simplest possible means without using a separate sensor, a physically based model can be applied, which simulates an exhaust gas recirculation valve as a throttle site arranged in the exhaust gas recirculation of the internal combustion engine. Because of this, the exhaust gas recirculation mass flow can be determined as a function of the exhaust gas counterpressure and the temperature of the returned exhaust in front of the exhaust gas recirculation valve, in which a flow through characteristic, an effective cross sectional surface of the exhaust gas recirculation valve and the gas constant can also be considered in the physically based model to determine the exhaust gas recirculation mass flow.

The temperature trend of the exhaust fed back via the exhaust gas recirculation is preferably simulated by means of the model, in order to derive the actual temperature of the returned exhaust in front of the exhaust gas recirculation valve from it.

The effective cross sectional surface of the exhaust gas recirculation valve can be adjusted as a function of a comparison between the measured charge pressure, with which the fresh air is fed to the mixing site, and a charge pressure, modeled by means of an additional model, by using a corresponding correction factor.

The flow characteristic just mentioned can be derived, for example, from the pressure ratio over the exhaust gas recirculation valve.

Several physically based (or also empirically determined) models are preferably applied, which are partly in close relation, so that, for calculation of a specific state quantity in one model, the results of another model can preferably be resorted to. It must be kept in mind that the formally described dependences here of the individual quantities generally only explain the proportional relations, so that normalization or correction factors (not stated) for additional conversion of the corresponding quantities must be considered as function of the corresponding application or implementation.

Overall, the exhaust gas recirculation mass flow of an internal combustion engine, for example, a diesel engine, can be therefore determined exactly with simple means by evaluation of already known state quantities. The use of additional sensors is not necessary for this. By the therefore simple possible determination of an exhaust gas recirculation mass flow, new control and diagnosis methods within the corresponding engine management system are possible, which permits, for example, an emission-optimal regulation of the internal combustion engine.

This invention aspect therefore includes especially the following features:

In a method for determination of the exhaust gas recirculation mass flow of an internal combustion engine with exhaust gas recirculation, fresh air is mixed with an exhaust of the internal combustion engine fed back via the exhaust gas recirculation at a mixing site, and the gas mixture resulting from this is fed to the combustion chamber of the internal combustion engine, in which an exhaust gas recirculation valve arranged in the exhaust gas recirculation is simulated by means of a physically based model for a throttle site, and the exhaust gas recirculation mass flow flowing to the mixing site via the exhaust gas recirculation is determined by means of this model.

The exhaust gas recirculation mass flow can be determined as a function of an exhaust gas counterpressure and a temperature of the returned exhaust in front of the exhaust gas recirculation valve.

The temperature trend of the exhaust fed back via the exhaust gas recirculation can be simulated by means of the model and the temperature of the returned exhaust in front of the exhaust gas recirculation valve is derived from it.

The exhaust gas recirculation mass flow can be determined as a function of a flow characteristic, an effective cross sectional surface of the exhaust gas recirculation valve and a gas constant.

The exhaust gas recirculation mass flow $dm_{AGR}$ can be determined as follows from the effective cross sectional surface $A_{AGR}$ of the exhaust gas recirculation valve, the exhaust gas counterpressure $p_{AGR}$, the temperature $T_{AGR}$ of the returned exhaust, the gas constant R and the flow characteristic DF:

$$dm_{AGR} = A_{AGR} \cdot p_{AGR} \cdot \frac{2}{\sqrt{R \cdot T_{AGR}}} \cdot DF,$$

in which for the case, in which the exhaust gas recirculation mass flow flows from an intake line of the internal combustion engine into an exhaust line of the internal combustion engine, the charge pressure of the fresh air in the intake line is used as value for the exhaust gas counterpressure and the charge temperature of the fresh air in the intake line is used as value for the temperature.

The effective cross sectional surface of the exhaust gas recirculation valve can be adjusted as a function of a comparison between a measured charge pressure, with which the fresh air is fed to the mixing site, and a charge pressure modeled by means of an additional model by using a corresponding correction factor.

The flow characteristic can be derived from a pressure ratio over the exhaust gas recirculation valve.

The method can be executed automatically by a control device, which is a component of the engine management system of the internal combustion engine.

In a control system for an internal combustion engine with exhaust gas recirculation, in which fresh air is mixed with an exhaust of the internal combustion engine fed back via the exhaust gas recirculation at a mixing site, and the gas mixture resulting from it is fed to the combustion chamber of and internal combustion engine, in which the control system is configured so that it automatically determines the exhaust gas recirculation mass flow flowing via the exhaust gas recirculation through the mixing site to control the internal combustion engine by means of a physically based model, which simulates an exhaust gas recirculation valve as throttle site arranged in the exhaust gas recirculation.

The control system can be is configured to execute the above mentioned.

BRIEF DESCRIPTION OF THE DRAWINGS

The present invention is explained further below with reference to the accompanying drawing by means of a preferred practical example.

DETAILED DESCRIPTION OF THE PREFERRED EMBODIMENTS

Figure 1:
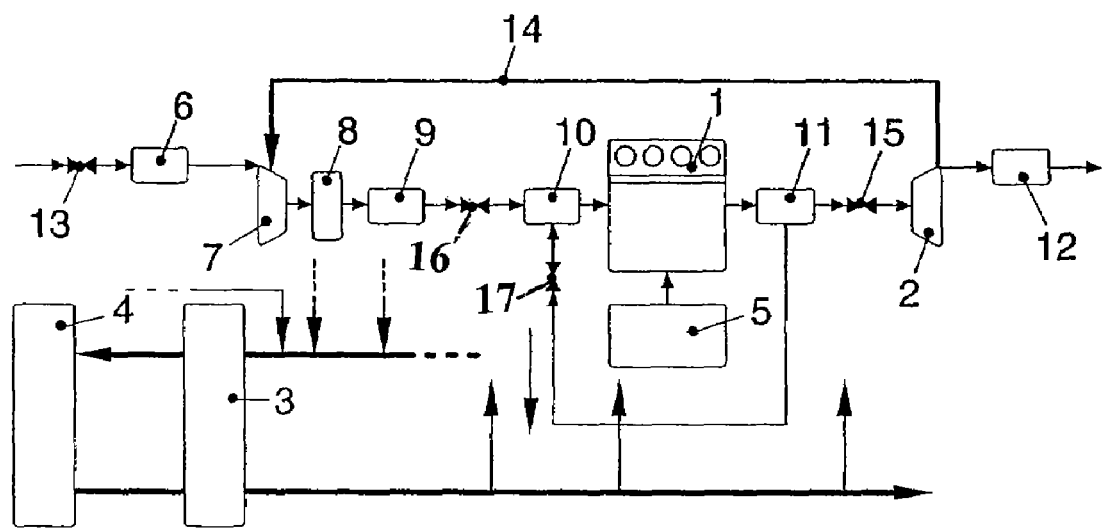
FIG. 1 shows a simplified view of a simulation model to simulate the gas flow in a vehicle or a corresponding internal combustion engine according to the present invention.

An internal combustion engine 1 with four combustion chambers or cylinders is shown in FIG. 1. The internal combustion engine 1 is coupled to an exhaust gas turbo-supercharger (ATL), which includes a turbine 2 and a compressor 7, in which the turbine and the compressor 7 are mounted on a common shaft, the so-called turbo-supercharger shaft 14. The turbine 2 uses the energy contained in the exhaust of the internal combustion engine 1 to drive the compressor 7, which takes in fresh air via an air filter 6 and forces pre-compressed air into the individual combustion chambers of internal combustion engine 1. The exhaust gas turbo-supercharger formed by turbine 2, compressor 7 and turbo-supercharger shaft 14 is only coupled to the internal combustion engine 1, in terms of flow, through the air and exhaust mass flow.

The air, admitted and pre-compressed by the compressor 7 via air filter 6, is fed via a charge air cooler (LLK) 8, which reduces the exhaust temperature and therefore the $NO_x$ emission, as well as the fuel consumption, to a so-called replacement volume (ERS) 9. An intake collector (ELS) 10 is connected in front of the individual combustion chambers of the internal combustion engine 1. The exhaust generated in the combustion chambers of the internal combustion engine 1 is collected by an exhaust collector (ASA) 11 and fed to turbine 2. Turbine 2 is connected in the exhaust flow direction after the exhaust system (APU) 12 of the vehicle, which breaks down the pollutant fractions of the exhaust forming during operation of internal combustion engine 1 and discharges the remaining exhaust with as little noise as possible. A part of the exhaust generated in the combustion chambers of the internal combustion engine 1 is returned to the intake collector 10 from the exhaust collector 11 via an exhaust gas recirculation (AGR) and mixed there with the admitted fresh air. Valves arranged in the corresponding air or gas paths are denoted with the reference numbers 13, 16, and 17. An adjustment element for guide blade adjustment of turbine 2 is denoted with the reference number 15.

In addition, a control unit 4 is shown in FIG. 1, which is a component of a corresponding engine management system of the vehicle. Different quantities are parameters of the depicted engine system are monitored by the control device 4 and converted to different intermediate and output quantities by using corresponding stored physically based models, in which the quantities are parameters monitored by the control device 4 are fed to the control device 4 via an interface 3. The individual quantities evaluated by the control device 4 are explained in detail subsequently by means of the individual physically based models. In particular, the mass and composition of the gas mixture present in the combustion chambers of the internal combustion engine 1, i.e., the fresh air and exhaust gas mass present in it, is determined by the control device 4 in this way and converted to corresponding control signals for the engine system to achieve emission-optimal regulation, which, as indicated in FIG. 1, can be applied to different components of the engine system via interface 3.

For a stable calculation of the total model formed by the individual physically based models by control device 4, for some parts of the total model, a specified minimal effective calculation time, for example, on the order of 2 ms, is required. Since this cannot be achieved with ordinary control device concepts, an already present time-synchronous grid is preferably used as a basis, and the total model calculated several times in this grid (overscanning). For example, in order to arrive at an effective calculation time of 2 ms in an existing 20 ms grid, the total model must be calculated ten times within the stipulated grid. Since the total model, which is composed of the individual already mentioned physically based partial models, serves for filling recording of the internal combustion engine, i.e., for exact determination of the fresh air and exhaust gas mass in the combustion chambers of the internal combustion engine, the total model can also be referred to as a filling model.

One of these physically based partial models executed by the control device 4 serves to simulate filling of the corresponding combustion chamber of the internal combustion engine 1 with the fresh air-exhaust gas mixture from the so-called intake manifold. The connection between the mixing site 10 depicted in FIG. 1, from which the fresh air admitted via compressor 7 is mixed with the exhaust gas returned via the exhaust gas recirculation line, and the intake valves of the internal combustion engine is referred to as intake manifold. This model can therefore also be referred to as an engine filling model.

By means of this engine filling model, the admitted gas mass in the combustion chamber can be determined as a function of the pressure $p_{sr}$ and the temperature $T_{sr}$ of the intake gas, which define the density of the intake gas with consideration of the gas constant R, in front of the engine intake valves, i.e., in the intake manifold, in which, for this purpose, a linear approach is chosen as a function of the density of the intake gas:

$$m_{ges} = d_1(n_0) + d_2(n_0) \cdot \frac{p_{sr}}{R \cdot T_{sr}} \cdot KORR \qquad (1)$$

$m_{ges}$ then denotes the admitted gas mass in the combustion chamber, i.e., the mass of the admitted fresh air/exhaust mixture, $n_0$ the (standardized) engine speed and KORR a correction factor, which will be taken up in detail subsequently. The filling behavior of the internal combustion engine 1 is dependent on the engine speed $n_0$. The coefficients $d_1$ and $d_2$ are therefore a function of engine speed $n_0$. This dependence of engine speed can be represented by quadratic polynomials:

$$d_1 = a_1 + a_2 \cdot n_0 + a_3 \cdot n_0^2$$

$$d_2 = a_4 + a_5 \cdot n_0 + a_6 \cdot n_0^2. \qquad (2)$$

$a_1$–$a_5$ denote coefficients of these quadratic polynomials. Alternately, the dependence just described of the engine speed can also be implemented by speed-dependent characteristics, in which a switch can be made in the control device 4 between these alternatives, for example, as a function of the instantaneous value of a corresponding variable.

Filling of the combustion chamber of the internal combustion engine 1 consists of fractions of fresh air and returned exhaust. The admitted gas mass flow $dm_{ges}$ can be calculated from the already determined gas mass $m_{ges}$ in the combustion chamber and the actual engine speed n of the internal combustion engine 1. The fresh air mass flow $dm_{Lmot}$ in the internal combustion engine 1 is obtained as follows, as a function of the admitted gas mass flow $dm_{ges}$ and the actual exhaust gas recirculation rate $r_{AGR}$:

$$dm_{Lmot}=(1-r_{AGR}) \cdot dm_{ges} \qquad (3)$$

The admitted gas mass flow $dm_{ges}$ and the admitted air mass flow $dm_{Lmot}$ are preferably calculated in the unit kg/s. A conversion to kg/h is naturally also possible.

As an additional intermediate quantity that can serve as a basis for calculation of the air ratio in the combustion chamber, the fresh air mass $m_{Lmot}$ in the combustion chamber of the internal combustion engine 1 can be determined as follows:

$$m_{Lmot}=(1-r_{AGR}) \cdot m_{ges} \qquad (4)$$

Similarly, the admitted exhaust gas recirculation mass flow in internal combustion engine 1 $dm_{AGRmot}$ can be calculated as follows from the admitted gas mass flow $dm_{ges}$ and the actual exhaust gas recirculation rate $r_{AGR}$:

$$dm_{AGRmot}=r_{AGR} \cdot dm_{ges} \qquad (5)$$

Similar to the fresh air mass in the combustion chamber of the internal combustion engine, the exhaust gas mass $m_{AGRmot}$ in the combustion chamber of the internal combustion engine can be determined from the already known admitted gas mass $m_{ges}$:

$$m_{AGRmot}=r_{AGR} \cdot m_{ges} \qquad (6)$$

As additional output quantity, the air ratio $R_L$ in the combustion chamber of the internal combustion engine 1 is determined by the engine filling model from the now known fresh air mass $m_{Lmot}$ and the injected fuel mass $m_{kr}$:

$$R_L = \frac{m_{Lmot}}{14.5 \cdot m_{kr}} \qquad (7)$$

By means of the already mentioned correction factor KORR, the engine filling model can be adapted to the actual behavior of the internal combustion engine, in which, for this purpose, a comparison occurs between a modeled charge pressure $p_{ladmod}$ and a measured actual charge pressure $p_{lad}$. This comparison can be conducted in an additional partial model that can be referred to as correction model. From the difference of these two quantities, an integrator can be supplied, whose output value gives the percentage correction factor KORR for total filling of the internal combustion engine 1. Preferably defined conditions, for example, a stationary engine operation without exhaust gas recirculation, must be present for this adaptation process. The control device 4 can contain a separate function block for this purpose, which controls adaptation release, i.e., the integrator, and, for this purpose, evaluates specific input quantities that establish the permitted adaptation range with respect to injection amount and speed, or monitors the time change of these quantities. Moreover, additional parameters can be fed to this function block, with which the maximum dynamic range of the fresh air mass flow and the charge pressure can be adjusted, in which case an engagement and disengagement behavior with hysteresis can preferably be implemented. The output quantity KORR of this function block of the control device 4 corrects, according to formula (1), the slope of the filling line and thus adjusts the engine filling model to the actual behavior of the internal combustion engine 1.

Figure 2:
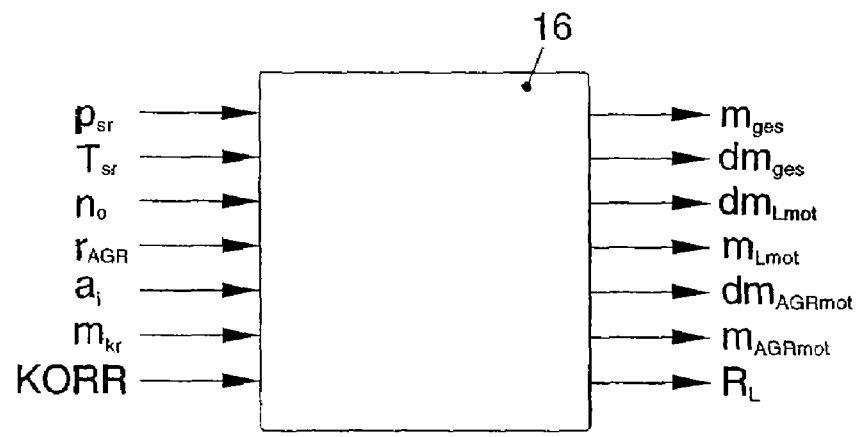
FIG. 2 shows a view to explain an engine filling model.

The engine filling model 16 just described, which is implemented in the control device 4, is schematically depicted in FIG. 2 with respect to its input and output quantities.

As already mentioned, exhaust is returned from the exhaust line to the intake line via the exhaust gas recirculation line indicated in FIG. 1. An additional physically based model is therefore provided that calculates the exhaust gas recirculation mass flow through the exhaust gas recirculation line, as well as the temperature of the returned exhaust in front of the exhaust gas recirculation-mixing site 10, so that this model is also subsequently referred to as exhaust gas recirculation mass flow model.

Determination of the exhaust gas recirculation mass flow $dm_{AGR}$ occurs by means of a model approach for a throttle site of the exhaust gas recirculation valve 17 present in the exhaust gas recirculation line (cf. FIG. 1) as a function of a flow characteristic DF, and effective cross sectional surface $A_{AGR}$ of the exhaust gas recirculation valve 17, the gas constant R, as well as the exhaust gas counterpressure $p_{AGR}$ and the temperature $T_{AGR}$ in front of the exhaust gas recirculation valve 17:

$$dm_{AGR} = A_{AGR} \cdot p_{AGR} \cdot \frac{2}{\sqrt{R \cdot T_{AGR}}} \cdot DF \qquad (8)$$

For calculation of the exhaust gas recirculation mass flow $dm_{AGR}$, a case discrimination must be conducted as a function of whether the exhaust gas recirculation mass flow flows from the exhaust line into the intake line ($dm_{AGR}>0$) or from the intake line into the exhaust line ($dm_{AGR}<0$). The above formula (8) therefore applies only for the case $dm_{AGR} \geq 0$, whereas for the case $dm_{AGR}<0$, the exhaust gas recirculation mass flow $dm_{AGR}$ can be determined as follows:

$$dm_{AGR} = A_{AGR} \cdot p_{sr} \cdot \frac{2}{\sqrt{R \cdot T_{sr}}} \cdot DF \qquad (9)$$

The square root functions contained in formulas (8) and (9) can preferably be approximated by a quadratic polynomial, which is valid, for example, in the temperature range from 200–1200 K of interest here. In order to consider the inertia of exhaust gas recirculation in the overall system, the exhaust gas recirculation mass flow in the exhaust gas recirculation mass flow model of control device 4 is preferably delayed by a PT1 element.

As already mentioned, not only is the exhaust gas recirculation mass flow $dm_{AGR}$ calculated by means of this model, but so is the temperature $T_{AGR}$ of the returned exhaust in front of the mixing site with the fresh air. The temperature $T_{AGR}$ is required, in particular, to calculate the exhaust gas recirculation mass flow $dm_{AGR}$ (cf. Formula (8)). For calculation of the temperature $T_{AGR}$ of the returned exhaust in front of the exhaust gas recirculation valve, a distinction must also be made between forward flow and backward flow. The following applies:

$$T_{AGR}=T_{AG}-RF(T_{AG}-T_K) \text{ for } dm_{AGR} \geq 0 \qquad (10)$$

$$T_{AGR}=T_{sr} \text{ for } dm_{AGR}<0 \qquad (11)$$

In the case of forward flow ($dm_{AGR} \geq 0$), hot exhausts are passed through the exhaust gas recirculation line, whereas in the case of backward flow, fresh air flows through the exhaust gas recirculation line. Cooling of the hot gases through the exhaust gas recirculation line is simulated according to formula (10) by the fact that $RF \cdot (T_{AG} - T_K)$ is subtracted from the exhaust gas temperature $T_{AG}$ in front of turbine 2, in which RF denotes a pipe factor of the exhaust gas recirculation line, with which cooling can be adapted to the type of exhaust gas recirculation path (for example, distinction between cooled and uncooled exhaust gas recirculation), whereas $T_K$ corresponds to the cooling water temperature of the internal combustion engine 1 and is therefore a gauge for cooling of the exhaust gas temperature $T_{AG}$. The exhaust gas temperature $T_{AG}$ in front of turbine 2 is generated by an additional physically based model that is further explained subsequently.

The flow characteristic DF required according to formulas (8) and (9) is a function of the pressure ratio over the throttle site simulated by this exhaust gas recirculation mass flow model, i.e., over the exhaust gas recirculation valve. Since the flow characteristic DF is also used in other models of the overall system, it is preferably also implemented as its own method, which can be called up by the other models. The corresponding method evaluates the pressure in front of the corresponding throttle site and the pressure behind the corresponding throttle site and returns from this a specified value for the flow characteristic DF depending on it. A distinction must therefore be made between a so-called supercritical flow case, in which the pressure ratio over the throttle site is smaller than a stipulated critical pressure ratio, and a subcritical case, in which the pressure ratio is larger than the critical pressure ratio.

Figure 10:
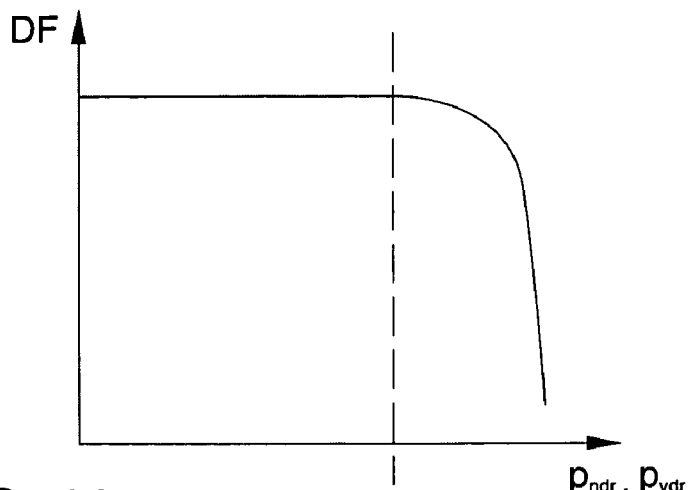
FIG. 10 shows the trend of a flow characteristic as a function of a pressure ratio.

The trend of the flow characteristic DF as a function of pressure ratio between pressure $p_{vdr}$ in front of the throttle site and pressure $p_{ndr}$ after the throttle site is shown in FIG. 10. It is apparent from FIG. 10 that in the supercritical flow case, which is separated according to FIG. 10 from the subcritical flow case by a dashed line, the flow characteristic DF can be equated to a specific maximum value. On the other hand, in the subcritical case, the flow characteristic DF is calculated according to a substitute function, which corresponds to the continuously diminishing curve trend for the subcritical case, shown in FIG. 10 as a function of pressure ratio. A distinction is then made, especially between the case of forward flow and the case of backward flow. Forward flow can be distinguished from backward flow, for example, by placing a corresponding bit in a corresponding variable.

Determination of the effect of cross sectional surface $A_{AGR}$ of the exhaust gas recirculation valve occurs by means of a map corrected by a correction factor AKORR, in which alternately the measured valve lift or control pulse duty factor of this valve is used by the control device 4 as input quantity of this map as a function of the instantaneous value of a corresponding bit. Which of these input quantities is used to determine the effective cross sectional surface of the exhaust gas recirculation valve depends on the type of adjustment device employed. In an electrical exhaust gas recirculation valve, the control pulse duty factor of a control device 4 is used as input quantity for the corresponding map, whereas in an adjustment device with charge feedback, the measured valve lift is used as input quantity. In order to allow for the inertia of the exhaust gas recirculation valve during an adjustment, the effective cross sectional surface of the exhaust gas recirculation valve calculated in this way can be delayed by a PT1 element.

With the aforementioned correction factor AKORR, just as in the engine filling model just described, the calculated valve cross sectional area of the exhaust gas recirculation valve can be corrected as a function of a comparison between the measured and modeled charge pressure in the stationary operating phases of the internal combustion engine 1. In this respect as well, an integrator can be used, which evaluates the difference between the measured and modeled charge pressure and delivers as output value the corresponding value AKORR for the calculated cross sectional area surface of the exhaust gas recirculation valve.

Figure 3:
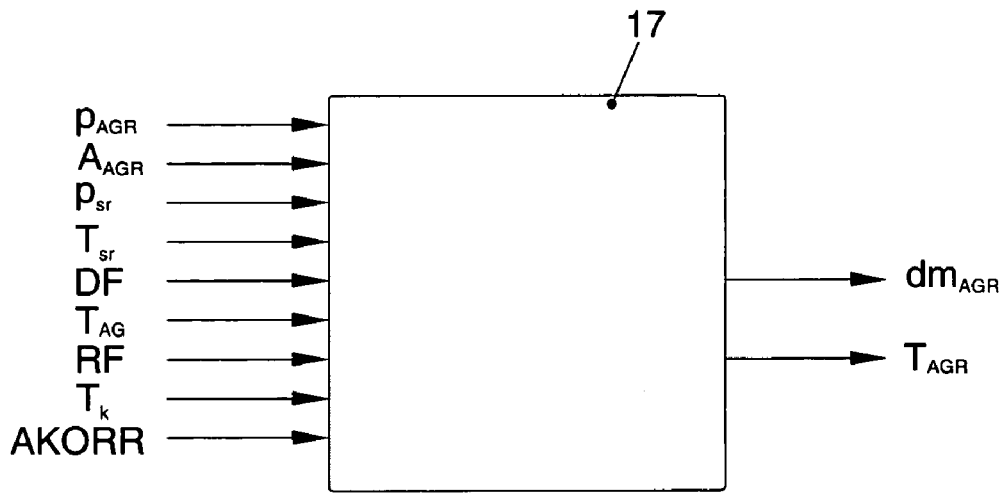
FIG. 3 shows a view to explain an exhaust gas recirculation mass flow model.

The exhaust gas recirculation mass flow model 17 just described is shown schematically in FIG. 3 with its input and output quantities.

By means of an additional model, which can be referred to subsequently as a turbine model, the behavior of the exhaust line in front of and after the turbine 2 depicted in FIG. 1, can be simulated. The exhaust gas counterpressure in front of the turbine 2 is determined by the turbine model as the most important output quantity. In addition, other output and intermediate quantities are calculated that will be taken up further below.

The blade path s of turbine 2 is an important quantity within the turbine model for determining the exhaust gas counterpressure in front of turbine 2. The blade path S can either be directly measured in combination with a corresponding analog/digital conversion or determined via the control pulse duty factor of the adjustment element 15 depicted in FIG. 1. Determination of the undelayed blade path s via this control pulse duty factor can occur by access to a corresponding map, which assigns each value of the control pulse duty factor to a corresponding value of blade path s of turbine 2. The dynamics of blade movement of turbine 2 is preferably considered by a PT1 element, in order to be able to simulate the time behavior of blade path s as well as possible.

The exhaust gas temperature $T_{AG}$ in front of turbine 2 is determined as a function of the injection amount $m_{kr}$ and the engine speed $n_0$ (normalized engine speed) or n (un-normalized engine speed) via a difference temperature approach between the exhaust gas temperature in front of turbine 2 and the manifold passage temperature, i.e., the temperature in the intake line. The difference temperature, i.e., the temperature increase as a result of combustion in front of turbine 2, is then determined via a map as a function of engine speed and injection amount or injected fuel mass. The difference temperature value $\Delta T1_{ASA}$ determined in this way can be corrected by multiplication as a function of the beginning of feed, i.e., the beginning of fuel injection, into the corresponding combustion chamber of the internal combustion engine 1, in order to obtain a final value for the difference temperature $\Delta T_{ASA}$, i.e., for the temperature increase by combustion in front of turbine 2:

$$\Delta T_{ASA} = \Delta T1_{ASA} \cdot \Delta T2_{ASA} \quad (12)$$

As an alternative, an additive correction can also occur:

$$\Delta T_{ASA} = \Delta T1_{ASA} + \Delta T2_{ASA} \quad (13)$$

The difference temperature correction value $\Delta T2_{ASA}$ is then determined by means of an additional map as a function of the beginning of feed FB. Switching between the two aforementioned alternatives (cf. formulas (12) and (13)) can occur as a function of the adjustment of the corresponding switch or corresponding bit.

The ejected exhaust gas mass flow $dm_{ASA}$ of the internal combustion engine 1 is calculated from the gas mass flow $dm_{ges}$ admitted by the internal combustion engine 1 or the corresponding combustion chamber, as well as the injected fuel mass flow $dm_{kr}$ or a fraction dependent on the injected fuel mass $m_{kr}$ and the engine speed n:

$$dm_{ASA} = dm_{ges} + dm_{kr} = dm_{ges} + f(n, m_{kr}) \quad (14)$$

The gas mass flow $dm_T$ through turbine 2 can be determined from the exhaust gas mass flow $dm_{ASA}$ ejected by the internal combustion engine 1 and the exhaust gas recirculation mass flow $dm_{AGR}$:

$$dm_T = dm_{ASA} - dm_{AGR} \quad (15)$$

In addition, an exhaust gas turbo-supercharger or compressor speed $n_v$, referred to the compressor 7, can be determined by means of a map as a function of the fresh air mass flow $dm_v$ for compressor 7 and the pressure ratio over compressor 7. To calculate the pressure ratio over compressor 7, the pressure behind the compressor 7 and the pressure in front of compressor 7 is determined, in order to then calculate the pressure ratio over compressor 7 from it. The pressure $p_{vv}$ in front of the compressor 7 or $p_{nv}$ after the compressor 7 can be determined as follows from the atmospheric pressure $p_A$, the fresh air mass flow $dm_{HFM}$ measured by the hot film air mass sensor and fed to the input side in the model depicted in FIG. 1, the atmospheric pressure $T_A$, the charge pressure $p_{lad}$ and the charge temperature $T_{lad}$:

$$p_{vV} = p_A - \frac{dm_{HFM}^2 \cdot T_A}{p_A} \cdot VFAK1 \quad (16)$$

$$P_{nV} = p_{lad} - \frac{dm_{HFM}^2 \cdot T_{lad}}{p_{lad}} \cdot VFAK2$$

According to equation (16), a loss factor VFAK1 or VFAK2 is then used, in order to allow for the pressure loss in front of and after the compressor 7, which are determined by ratio formation from the gas constant R and the square of a corresponding substitute surface $A^2_{vv}$ or $A^2_{nv}$.

The fresh air mass flow $dm_v$ through the compressor 7 is defined as follows:

$$dm_v = dm_{HFM} \cdot \frac{K}{p_{vV}} \cdot \sqrt{\frac{T_A}{T_{0V}}} \quad (17)$$

K denotes a constant and $T_{0V}$ a reference temperature of compressor 7, which is used during measurement of the compressor map. The exhaust gas turbo-supercharger speed $n_{ATL}$ is calculated from the exhaust gas turbo-supercharger speed $n_v$, referred to compressor 7, as a function of the ambient or atmospheric pressure $T_A$ and the reference temperature $T_{0V}$ of the compressor 7, as follows:

$$n_{ATL} = n_v \cdot \sqrt{\frac{T_A}{T_{0V}}} \quad (18)$$

The square root function contained in formulas (17) and (18) can be calculated by a quadratic polynomial as a function of $T_A/T_{0V}$ for reasons of calculation time.

As an additional output quantity, the temperature $T_{nT}$ in the exhaust line behind turbine 2 is calculated by means of the turbine model. This occurs as a function of temperature $T_{vT}$ of the turbine 2 by simulating the temperature reduction over turbine 2, in which the turbine efficiency $\eta_T$ is also considered, as follows:

$$T_{nT} = T_{vT}(1 - \Delta T_T \eta_T) \quad (19)$$

The temperature change $\Delta T_T$ over the turbine 2 is determined by means of a corresponding characteristic as a function of the pressure ratio over turbine 2, i.e., the ratio between the pressure $p_{vT}$ in front of the turbine and the pressure $p_{nT}$ after the turbine, whereas the efficiency $\eta_T$ of turbine 2 is applied by means of a corresponding characteristic as a function of the blade path s of turbine 2. The temperature $T_{vT}$ in front of turbine 2 corresponds to the already determined value $T_{AG}$, i.e., the exhaust gas temperature in front of turbine 2. The pressure $p_{vT}$ in front of turbine 2 likewise corresponds to the model exhaust gas counterpressure $p_{AG}$ in front of turbine 2.

As an additional quantity, the exhaust gas counterpressure $p_{nT}$ behind the turbine is calculated, in which a pressure difference is determined for this purpose between the exhaust gas line behind turbine 2 and the atmospheric pressure $p_A$. This can also occur via a corresponding characteristic, in which the gas mass flow $dm_T$ through turbine 2 is used as input quantity for this characteristic, which is corrected by multiplication, as follows, by the square root of the exhaust gas temperature $T_{nT}$ after the turbine 2:

$$dm_T^* = dm_T \cdot \sqrt{T_{nT}} \quad (20)$$

As a function of the corrected gas mass flow $dm^*_T$ through turbine 2, the pressure difference $\Delta p_{nT}$ between the exhaust line behind turbine 2 and the atmospheric pressure $p_A$ can be determined with a quadratic equation as a function of $\Delta p_{nT}$, in which the coefficients of this quadratic equation are applicable. The exhaust gas counterpressure $p_{nT}$ after turbine 2 (in bar) is obtained for the case in which no exhaust gas counterpressure sensor is present in the exhaust line after turbine 2, as follows from the addition of atmospheric pressure $p_A$ and the calculated pressure difference $\Delta p_{nT}$:

$$p_{nT} = (\Delta p_{nT} + p_A)/10^5 \quad (21)$$

If, on the other hand, an exhaust gas counterpressure sensor is provided in the exhaust line or a difference pressure sensor behind turbine 2, the pressure difference $\Delta p_{AG}$ measured by this exhaust gas counterpressure sensor is added to the modulated exhaust gas counterpressure behind turbine 2:

$$p_{nT} = (\Delta p_{nT} + p_A + \Delta p_{AG})/10^5 \quad (22)$$

The exhaust gas counterpressure $p_{vT}$ in front of turbine 2 can be calculated from the exhaust gas counterpressure $p_{nT}$ after turbine 2 by means of a polynomial with 13 coefficients as a function of the input quantities turbine mass flow $dm_T$, blade path s and exhaust gas turbo-supercharger speed $n_{ATL}$, in which the last three quantities are preferably used standardized by means of corresponding applicable parameters. An example of a preferred calculation procedure for determining the exhaust gas counterpressure $p_{vT}$ in front of turbine 2 is given below, in which, however, any combinations of the input quantities are possible:

$$p_{vT} = Z \cdot p_{nT} \quad (23)$$

$$Z = b_0 + b_1 \cdot dm_T + b_2 \cdot (s - 0,5) +$$

$$b_3 \cdot s^2 + b_4 \cdot (n_{ATL} - 0,5)^2 +$$

$$b_5 \cdot (dm_T + 0,5) \cdot (s + 0,5) +$$

-continued $$b_6 \cdot (dm_T - 0,5) \cdot s^2 +$$
$$b_7 \cdot (s - 1) \cdot (n_{ATL} - 0,5)^2 +$$
$$b_8 \cdot (s - 1) \cdot (s - 0,5)^2$$
$$b_9 \cdot (dm_T - 1)^2 +$$
$$b_{10} \cdot (dm_T - 1) \cdot (dm_T + 0,5)^2 \cdot dm_T +$$
$$b_{11} \cdot [(dm_T - 1) \cdot (s - 0,5)^3 - 0,5] \cdot b_{12} +$$
$$b_{13}$$

The coefficients $b_0$–$b_{13}$ are preferably variable.

The exhaust gas counterpressure $p_{AGR}$ in front of the exhaust gas recirculation valve 17 depicted in FIG. 1 is calculated as additional output quantity. It is obtained as follows as a function of the exhaust gas counterpressure in front of the turbine $p_{vT}$, the exhaust gas recirculation mass flow $dm_{AGR}$, the exhaust gas temperature in front of the turbine $T_{vT}$ and a constant PF:

$$p_{AGR} = p_{vT} - \left(dm_{AGR}^2 \cdot T_{vT} \cdot \frac{PF}{p_{vT}}\right) \quad (24)$$

The exhaust gas counterpressure $p_{vT}$ in front of the turbine and the exhaust gas temperature $T_{vT}$ in front of the turbine are preferably used in formula (24), delayed or filtered by means of a PT1 element.

In this approach, a pressure drop is considered in the exhaust gas recirculation in front of or behind the exhaust gas recirculation valve. The pressure drop is applicable over the effective cross sectional surface $A_{eff}$ of the exhaust gas recirculation line (without exhaust gas recirculation valve). During an initialization phase of the control device 4, the parameter PF can be calculated as follows from it, in which R denotes the gas constant:

$$PF = \frac{R}{A_{eff}^2} \quad (25)$$

Figure 4:
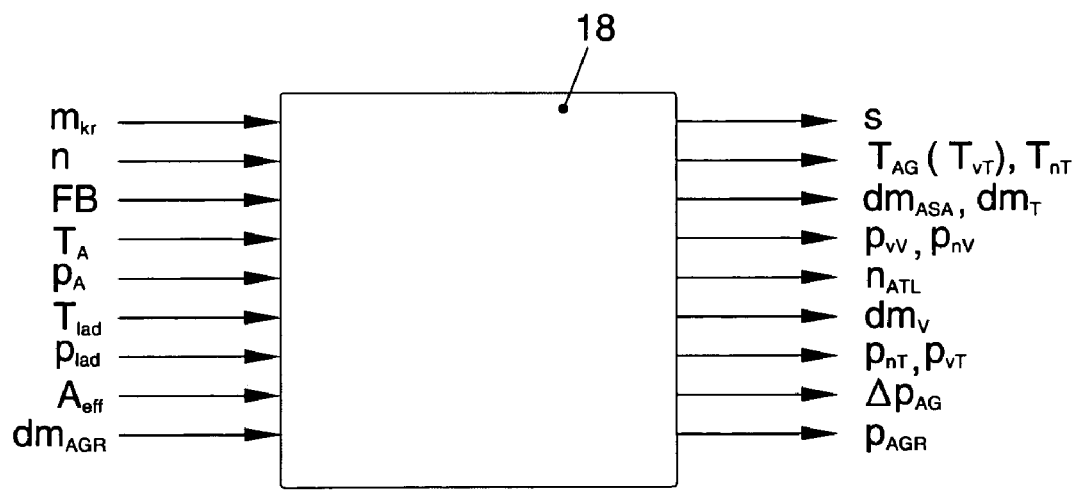
FIG. 4 shows a view to explain a turbine model.

The turbine model 18 just explained at length is schematically shown in FIG. 4 with respect to its input and output quantities.

Figure 5:
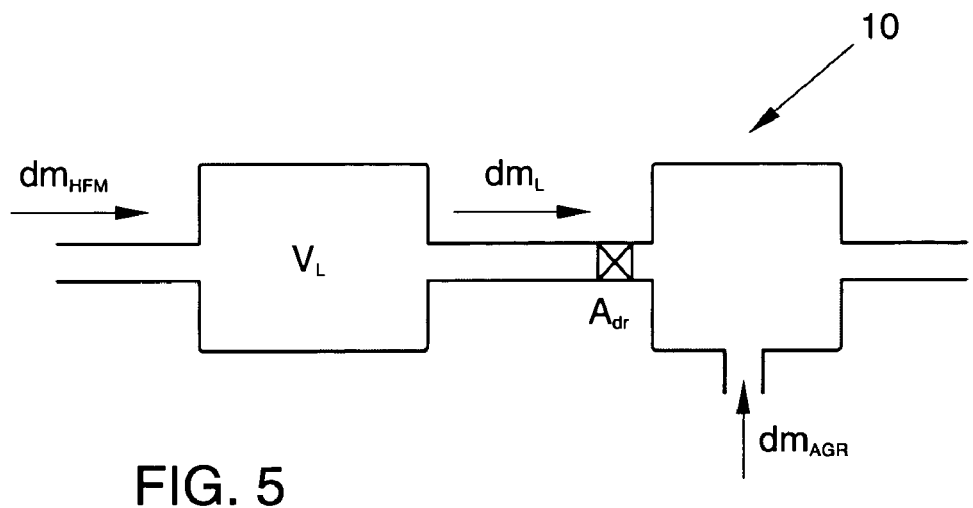
FIG. 5 shows a schematic view of the intake line of the internal combustion engine depicted in FIG. 1.

Another physically based model is used to simulate the storage behavior of the intake line between the compressor 7 depicted in FIG. 1 and the exhaust gas recirculation-fresh air mixing site 10, also depicted in FIG. 1. This model is subsequently also referred to as the fresh air mass flow model and consists of simulation of a storage volume $V_L$ for the admitted fresh air and a subsequent throttle site with the effective cross sectional surface $A_{dr}$, as shown in FIG. 5.

The fresh air mass flow $dm_L$, through the aforementioned throttle site into the intake manifold, i.e., engine intake, the stored fresh air mass $m_{Ls}$ in the storage volume between the compressor 7 and the exhaust gas recirculation-fresh air mixing site 10, as well as the modeled charge pressure $p_{ladmod}$, are determined as output quantities of this fresh air mass flow model. Moreover, the difference $\Delta dm_L$ between the measured fresh air mass flow $dm_{HFM}$ of the hot film air mass sensor and the fresh air mass flow $dm_L$ flowing in the internal combustion engine 1 is determined.

The modeled charge pressure $p_{ladmod}$ can be calculated as follows from the fresh air mass $m_{lad}$ in the volume between the compressor 7 and the intake manifold or engine intake and a measured charge temperature $T_{lad}$ of the fresh air:

$$p_{lad\,mod} = m_{lad} \cdot \frac{R}{V_L} \cdot T_{lad} \quad (26)$$

The charge air temperature $T_{lad}$ is then preferably used PT1-filtered.

The fresh air mass flow $dm_L$ into the intake manifold can be determined as follows as a function of the PT1-filtered, measured charge air temperature $T_{lad}$, the modeled charge pressure $p_{ladmod}$, the gas constant R, the modeled manifold passage pressure $p_{sr}$, i.e., the pressure of the intake gas in front of the intake valves of the internal combustion engine 1, and the effective cross sectional surface $A_{dr}$ of the throttle valve in front of the exhaust gas recirculation-fresh air mixing site:

$$dm_L = A_{dr} \cdot p_{lad\,mod} \cdot \frac{2}{\sqrt{R \cdot T_{lad}}} \cdot DF \quad (27)$$

The fresh air mass flow $dm_L$ determined in this way can also be filtered by means of a corresponding PT1 element, in order to simulate the inertia of the fresh air mass flow. The time constants used during PT1 filtering, which simulate the fresh air mass flow for a positive or negative change, should be chosen as small as possible (for example, <20 ms). The square root in formula (27) can again be approximated by a third-order polynomial. As already described with reference to the engine filling model previously explained, the flow characteristic DF is again determined by a corresponding function call up.

The effective cross sectional surface $A_{dr}$ of the throttle site is a function of the control pulse duty factor of the control device 4, also delayed by a PT1 element, in which the time constant of the PT1 element in this case should be chosen so that they largely correspond to the time constants for opening and closing of the throttle valve.

From the mass flow balance of the volume between the compressor 7 and the intake manifold or engine intake if internal combustion engine 1, the fresh air mass $m_{lad}$ is obtained from integration of the difference mass flow $\Delta dm_L$ between the inflowing, measured fresh air mass flow $dm_{HFM}$ and the outflowing model fresh air mass flow $dm_L$ into the intake manifold:

$$m_{lad} = \int_{t}^{t+T_0} \Delta dm_L d\tau \quad (28)$$

$$\Delta dm_L = dm_{HFM} - dm_L$$

To then denotes the correspondingly chosen time integration interval. The fresh air mass $m_{lad}$, determined in this way between the compressor and the intake manifold of the internal combustion engine, is preferably limited by the corresponding integrator output to a minimum value and a maximum value. The integrator time constant is preferred variably adjustable by means of a corresponding parameter.

The fresh air mass $m_{lad}$ determined in this way forms, as already described, the basis for determining the modeled charge pressure $p_{ladmod}$ according to formula (28) by using the ideal gas law.

Figure 6:
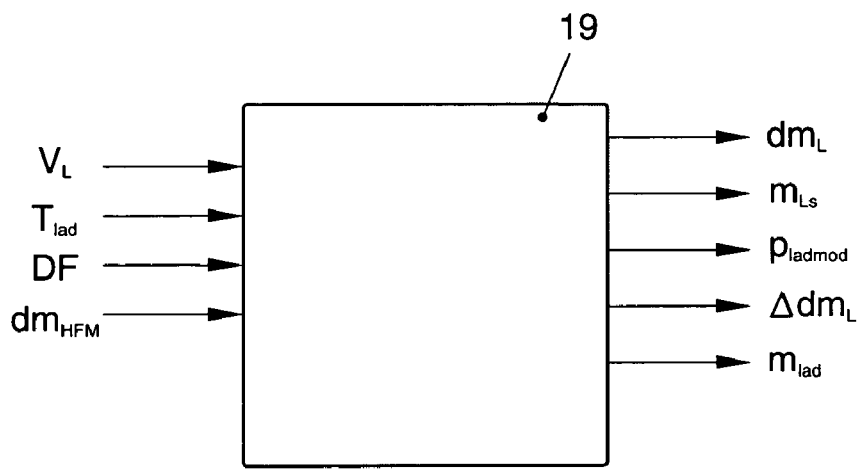
FIG. 6 shows a view to explain a fresh air mass flow model.

The fresh air mass flow model 19 just explained at length is schematically depicted in FIG. 6 with respect to its input and output quantities.

Figure 7:
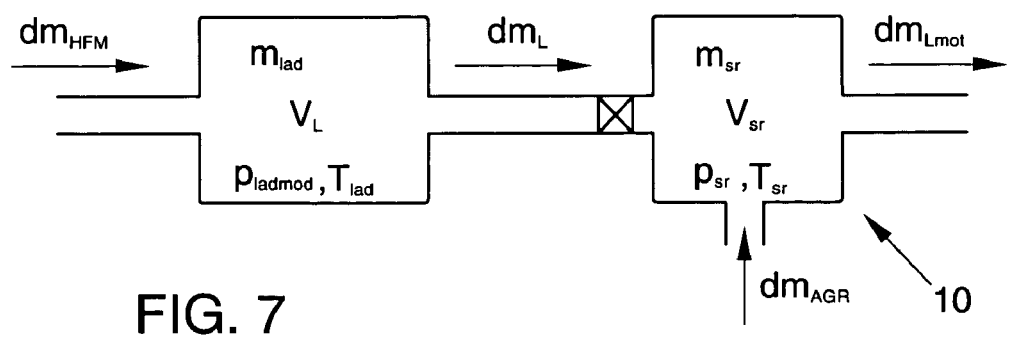
FIG. 7 shows a schematic view of the intake line of the internal combustion engine depicted in FIG. 1.

By means of an additional model, the behavior of the intake manifold, i.e., the connection between the exhaust gas recirculation/fresh air mixing site and the engine intake valves, is simulated, in which the intake manifold is also modeled by a vessel with a volume $V_{sr}$. This vessel is then referred to as manifold passage, so that the corresponding model can be referred to as manifold passage model. A schematic depiction of the intake line-manifold passage is shown in the schematic depiction of the intake line in FIG. 7, shown in FIG. 5.

The inflowing exhaust gas recirculation mass flow $dm_{AGR}$ and the fresh air mass flow $dm_L$ are mixed in the manifold passage to a fresh air/exhaust mixture, from which the internal combustion engine 1 obtains its filling. The exhaust gas recirculation mass and the fresh air mass in the manifold passage can be calculated by integration from the mass flow balances for the fresh air and recirculated exhaust mass.

The fresh air mass $m_L$ is obtained from integration of the difference between the inflowing and outflowing fresh air mass flow in the manifold passage:

$$m_L = \int_t^{t+T_0} (dm_L - dm_{Lmot}) d\tau \text{ for } dm_{AGR} \geq 0 \quad (29)$$

$$m_L = \int_t^{t+T_0} (dm_L - dm_{Lmot} + dm_{AGR}) \text{ for } dm_{AGR} < 0$$

As is apparent from formula (29), for calculation of the fresh air mass $m_L$, a case distinction is made as a function of whether exhaust gas flows into the manifold passage via the exhaust recirculation line ($dm_{AGR} \geq 0$) or fresh air flows into the exhaust line from the manifold passage ($dm_{AGR} < 0$). Within the manifold passage model, the integration outputs, and therefore the calculated fresh air mass $m_L$, are preferably limited to a minimum value and a maximum value.

Calculation of the returned exhaust gas mass $m_{AGR}$ in the manifold passage occurs similarly to calculation of the fresh air mass. By integration of the difference from the inflowing exhaust gas recirculation mass flow $dm_{AGR}$ and the exhaust gas recirculation mass flow $dm_{AGRmot}$ flowing into the engine, the mass $m_{AGR}$ of returned exhaust is obtained in the manifold passage:

$$m_{AGR} = \int_t^{t+T_0} (dm_{AGR} - dm_{AGRmot}) d\tau \text{ for } dm_{AGR} \geq 0 \quad (30)$$

$$m_{AGR} = \int_t^{t+T_0} -dm_{AGRmot} d\tau \text{ for } dm_{AGR} < 0 \text{ and } m_{AGR} > 0$$

In the case of a negative exhaust gas recirculation mass flow, it is assumed for simplification that only the fresh air flows into the exhaust line via the exhaust gas recirculation line, i.e., it is assumed: $dm_{AGR} = 0$. The mass of the recirculated exhaust is again limited over the integrator output to a minimum value and a maximum value.

The time constants of the integrators used to calculate the air mass and recirculation exhaust mass in the manifold passage, as well as their validity ranges, are preferably variable via corresponding parameters.

The total gas mass $m_{sr}$ is then obtained from addition of the fresh air mass $m_L$ and the exhaust gas mass $m_{AGR}$ in the manifold passage. In an initialization phase of the control device 4, an initial value can be calculated for the fresh air mass $m_L$ and the exhaust gas mass $m_{AGR}$, as a function of an assignable temperature and assignable pressure.

The pressure $p_{sr}$ in the manifold passage is obtained as a function of volume $V_{sr}$ from the ideal gas law:

$$p_{sr} = \frac{m_{sr} \cdot R \cdot T_{sr}}{V_{sr}} \quad (31)$$

Finally, as an additional output quantity of the manifold passage model, the exhaust gas recirculation rate $r_{AGR}$ is calculated as follows from the mass fractions in the manifold passage:

$$r_{AGR} = \frac{m_{AGR}}{m_{sr}} \quad (32)$$

Figure 8:
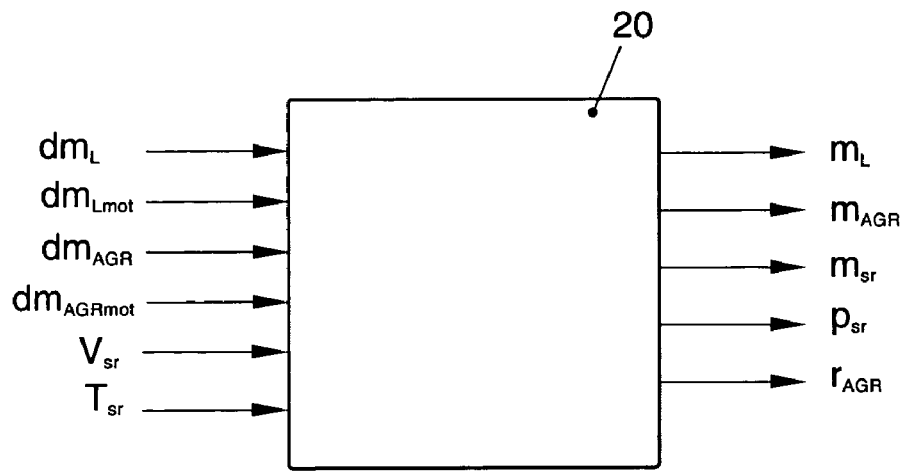
FIG. 8 shows a view to explain a manifold passage model.

The manifold passage model (20) just explained in detail is schematically shown in FIG. 8 with respect to its input and output quantities.

In another physically based model that is implemented in the control device 4, the manifold passage temperature $T_{sr}$ of the fresh air/exhaust gas mixture in the manifold passage is determined.

The manifold passage temperature $T_{sr}$ is then determined as a function of the exhaust gas recirculation mass $m_{AGR}$ in the manifold passage and the temperature $T_{AGR}$ of the exhaust gas recirculation mass flow, as well as the fresh air mass $m_L$ in the manifold passage and the (PT1-delayed) temperature $T_{lad}$ of the inflowing fresh air mass flow:

$$T_{sr} = \frac{T_{AGR} \cdot m_{AGR} + T_{lad} \cdot m_L}{m_{AGR} + m_L} \text{ for } m_{AGR} + m_L \neq 0$$

For the case, in which the denominator of formula (33), i.e., the total mass in the manifold passage, corresponds to the value 0, the manifold passage temperature $T_{sr}$ is set at the value of the temperature $T_{lad}$ of the inflowing fresh air mass flow:

$$T_{sr} = T_{lad} \text{ for } m_{AGR} + m_L = 0 \quad (34)$$

The wall heat transitions in the manifold passage lead to cooling or heating of the fresh air/exhaust gas mixture. This temperature change can be considered by addition of an additional term $\Delta T_{sr}$:

$$T_{sr} = T_{sr} + \Delta T_{sr} \quad (35)$$

The temperature change $\Delta T_{sr}$ is dependent on the wall temperature $T_w$ of the manifold passage, as well as the temperature $T_{sr}$ of the fresh air/exhaust gas mixture in the manifold passage. The heating or cooling effect from wall heat transfer is additionally dependent on the actual engine operating point. This can be allowed for by means of a map during calculation of the temperature change $\Delta T_{sr}$, in which in this map a factor can be adjusted, depending on the speed end and the fresh air mass flow $dm_{Lmot}$ admitted into the combustion chamber of the internal combustion engine 1:

$$\Delta T_{sr} = (T_w - T_{sr}) \cdot f(n, dm_{Lmot}) \quad (36)$$

It is apparent from formula (36) that a temperature change $\Delta T_{sr}$ is calculated from the difference value of the wall temperature $T_w$ of the manifold passage and the temperature $T_{sr}$ of the fresh air/exhaust gas mixture in the manifold passage, in which this difference value is multiplied by a factor that is dependent on the engine speed end and the admitted fresh air mass flow $dm_{Lmot}$ of the internal combustion engine 1. The wall temperature $T_w$ of the manifold passage can be calculated from the PT1-filtered cooling water temperature $T_k$ and an applicable wall heat factor WF:

$$T_W = T_K \cdot WF \qquad (37)$$

The output quantity, i.e., the manifold passage temperature $T_{sr}$, of the manifold passage temperature model is again preferably determined with a time delay by a PT1 element.

Figure 9:
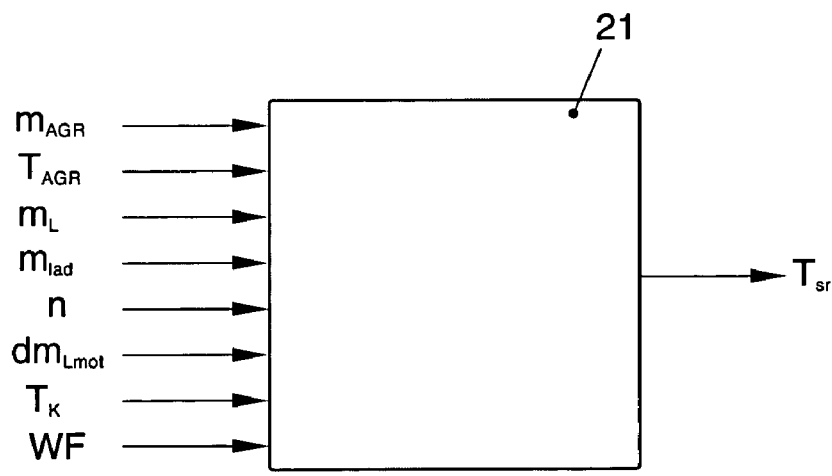
FIG. 9 shows a view to explain a manifold passage temperature model.

The manifold passage temperature model 21 just explained is schematically depicted in FIG. 9 with respect to its input and output quantities.

As already explained, additionally physically based models or functions or methods can be provided, which can be called up from the individual models just described in detail, in order to be able to determine specific quantities as a function of the corresponding parameters. One such function or method, as already explained, can be provided for determination of the flow characteristic DF.

Moreover, a function for conversion of specific quantities and for furnishing specific constants and parameters can be provided, to which the individual models can turn. To improve clarity, quantities in SI units are mostly considered in the total model. For this reason, preliminary processing or conversions of the employed quantities is necessary for individual partial or submodels, which can be done by this function block. Separate sections or methods can then be provided for processing of speed-synchronous quantities and time-synchronous quantities. An example of such a conversion is the conversion of input signals for path measurement systems. If path measurement systems that require signal processing of a control device 4 are to be used for the exhaust gas recirculation valve and blade position, additional characteristics must be provided that permit conversion of the voltage signals to the corresponding path. Another example of such conversion is the consideration of hysteresis and looseness of the blade adjustment systems of turbine 2. The blade adjustment system, for reasons of design, has a hysteresis behavior that is attributed to the looseness between the guide pin of the corresponding control rod and the guide blades on the adjustment ring of the turbine 2. Because of this, dead paths can be obtained during reversal of direction of the control rod, in which no blade adjustment occurs. In order to allow for this behavior, the blade path determined by a path system is preferably shifted on one side in direction-dependent fashion, in which the blade path can be adjusted via a corresponding parameter.

Another centrally furnished method or another centrally furnished function block can be provided to implement the already explained PT1 filtering of different quantities. For this purpose, this method is implemented so that it is called up with time constants that are switched as a function of input signal direction (rising or descending). Moreover, this method is preferably also called up with a parameter that describes the corresponding time grid, in addition to stating the corresponding input signal. The return value of this method or this function block is then the PT1-filtered input signal.

We claim:

1. A method for determination of the composition of the gas mixture in a combustion chamber of an internal combustion engine with exhaust gas recirculation, comprising the steps of:

mixing fresh air with the exhaust of an internal combustion engine wherein the exhaust is recirculated via the exhaust gas recirculation at a mixing site, feeding the gas mixture resulting from the mixing site to the combustion chamber of the internal combustion engine, and determining the filling of the combustion chamber of the internal combustion engine by simulation which determines a total mass of the gas mixture in the combustion chamber of the internal combustion engine as a function of the pressure and temperature of the gas mixture in front of the internal combustion engine using coefficients that are dependent on the speed of the internal combustion engine wherein the coefficients are determined by quadratic polynomials as a function of the speed of the internal combustion engine.

2. The method according to claim 1, wherein the coefficients are determined by means of characteristic curves that are dependent on the speed of the internal combustion engine.

3. The method according to claim 2, wherein during determination of the total mass as a function of the pressure and the temperature in front of the internal combustion engine, a correction factor is used.

4. The method according to claim 1, wherein during determination of the total mass as a function of the pressure and the temperature in front of the internal combustion engine, a correction factor is used.

5. The method according to claim 4, wherein the correction factor is adjusted as a function of the difference between a measured pressure of the fresh air and a pressure of the fresh air.

6. The method according to claim 1, wherein the total gas mass flow of the gas mixture in the combustion chamber of the internal combustion engine is determined from the total mass.

7. The method according to claim 6, wherein the fresh air mass flow and the exhaust gas recirculation mass flow in the combustion chamber of the internal combustion engine are determined as a function of the total gas mass flow in the combustion chamber of the internal combustion engine, with consideration of an exhaust gas recirculation rate.

8. The method according to claim 1, wherein the fresh air mass and the exhaust gas mass in the combustion chamber of the internal combustion engine are determined as a function of the total mass in the combustion chamber of the internal combustion engine, with consideration of an exhaust gas recirculation rate.

9. The method according to claim 8, wherein an air ratio in the combustion chamber of the internal combustion engine is determined from the fresh air mass in the combustion chamber of the internal combustion engine and a fuel mass injected into a combustion chamber of the internal combustion engine.

10. The method according to claim 1, wherein the exhaust gas recirculation mass flow flowing to the mixing site via the exhaust gas recirculation is simulated.

11. The method according to claim 10, wherein the exhaust gas recirculation mass flow is determined as a function of a flow characteristics, an effective cross sectional surface of an exhaust recirculation valve contained in the exhaust gas recirculation, a gas constant, as well as an exhaust gas counterpressure and a temperature of the recirculated exhaust in front of the exhaust gas recirculation valve.

12. The method according to claim 11, wherein the temperature trend of the exhaust recirculated via the exhaust gas recirculation is simulated and the temperature of the recirculated exhaust in front of the exhaust gas recirculation valve is derived from said simulated temperature trend.

13. The method according to claim 12, wherein the exhaust gas recirculation mass flow is determined as follows from the effective cross sectional surface of the exhaust gas recirculation valve, the exhaust gas counterpressure, the temperature, the gas constant and the flow characteristics:

$$dm_{AGR} = A_{AGR} \cdot p_{AGR} \cdot \frac{2}{\sqrt{R \cdot T_{AGR}}} \cdot DF$$

in which, for the case, in which the exhaust gas recirculation mass flow flows from an intake line of the internal combustion engine to an exhaust line of the internal combustion engine, the charge pressure of the fresh air in the intake line is used as value for the exhaust counterpressure and the charge temperature of the fresh air of the intake line is used as value for temperature.

14. The method according to claim 11, wherein the exhaust gas recirculation mass flow is determined as follows from the effective cross sectional surface of the exhaust gas recirculation valve, the exhaust gas counterpressure, the temperature, the gas constant and the flow characteristics:

$$dm_{AGR} = A_{AGR} \cdot p_{AGR} \cdot \frac{2}{\sqrt{R \cdot T_{AGR}}} \cdot DF$$

in which, for the case, in which the exhaust gas recirculation mass flow flows from an intake line of the internal combustion engine to an exhaust line of the internal combustion engine, the charge pressure of the fresh air in the intake line is used as value for the exhaust counterpressure and the charge temperature of the fresh air of the intake line is used as value for temperature.

15. The method according to claim 11, wherein the effective cross sectional surface of the exhaust gas recirculation valve is adjusted as a function of a comparison between a measured charge pressure, with which the fresh air is fed to the mixing site, and a charge pressure using a corresponding correction factor.

16. The method according to claim 11, wherein the flow characteristic is derived from the pressure ratio over the exhaust gas recirculation valve.

17. The method according to claim 1, wherein the storage behavior of an intake line of the internal combustion engine is simulated between a compressor connected to the internal combustion engine and a mixing site.

18. The method according to claim 17, wherein the storage behavior of the intake line is simulated by modeling a storage volume for the fresh air admitted by the intake line with a subsequent throttle site with a specific effective cross sectional surface.

19. The method according to claim 18, wherein a fresh air mass flow flowing to the mixing site through the intake line is determined as a function of a temperature and a pressure of the fresh air, as well as the effective cross sectional surface of the throttle site.

20. The method according to claim 19, wherein the fresh air mass flow is determined as follows as a function of the temperature of the fresh air, the pressure of the fresh air, the effective cross sectional surface of the throttle site and a flow characteristic:

$$dm_L = A_{dr} \cdot p_{lad\ mod} \cdot \frac{2}{\sqrt{R \cdot T_{lad}}} \cdot DF.$$

21. The method according to claim 20, wherein the pressure of the fresh air is determined as a function of a fresh air mass situated between the compressor and the mixing site and the temperature of the fresh air.

22. The method according to claim 19, wherein the pressure of the fresh air is determined as a function of a fresh air mass situated between the compressor and the mixing site and the temperature of the fresh air.

23. The method according to claim 22, wherein the pressure of the fresh air is determined as follows, as a function of the fresh air mass, the storage volume and the temperature of the fresh air:

$$p_{lad\ mod} = m_{lad} \cdot \frac{R}{V_L} \cdot T_{lad}$$

in which R denotes a gas constant.

24. The method according to claim 22, wherein the fresh air mass is determined by time integration of a fresh air mass flow difference between the fresh air mass flow flowing into the compressor and the fresh air mass steam flowing from the compressor to the mixing site.

25. The method according to claim 1, wherein the method is automatically executed by a control device, which is a component of the engine management system of the internal combustion engine.

26. A method for determination of the composition of the gas mixture in a combustion chamber of an internal combustion engine with exhaust gas recirculation, comprising the steps of:
  mixing fresh air with the exhaust of an internal combustion engine wherein the exhaust is recirculated via the exhaust gas recirculation at a mixing site,
  feeding the gas mixture resulting from the mixing to the combustion chamber of the internal combustion engine, and
  simulating a behavior of an exhaust line of the internal combustion engine, before and after a turbine connected to the internal combustion engine by determining an exhaust gas temperature in front of the turbine as a function of the fuel mass injected in the combustion chamber of the internal combustion engine and the speed of the internal combustion engine, wherein, for determination of the exhaust gas temperature in front of the turbine, a temperature change, referred to the temperature of the gas mixture between the mixing site and the internal combustion engine, is determined as a function of the injected fuel mass and the speed of the internal combustion engine.

27. The method according to claim 26, wherein, to determine an exhaust counterpressure in front of the turbine, the blade path of the turbine is measured or derived from a control pulse duty factor of an adjustment element, provided to adjust the blades of the turbine.

28. The method according to claim 26, wherein an exhaust gas temperature in front of the turbine is determined as a function of the fuel mass injected in the combustion chamber of the internal combustion engine and the speed of the internal combustion engine.

29. The method according to claim 26, wherein the temperature change is corrected as a function of a feed start of the fuel to be injected into the combustion chamber of the internal combustion engine.

30. The method according to claim 26, wherein an exhaust gas mass flow, ejected by the internal combustion engine, is derived from a total mass flow fed to the combustion chamber of the internal combustion engine of the gas mixture and a fuel mass injected into the combustion chamber of the internal combustion engine.

31. The method according to claim 30, wherein an exhaust gas mass flow flowing through the turbine is determined from the exhaust gas mass flow ejected by the internal combustion engine and from exhaust gas recirculation mass flow flowing through the exhaust gas recirculation.

32. The method according to claim 26, wherein a speed of an exhaust gas turbo-supercharger shaft connected to the turbine and a compressor connected to the internal combustion engine are determined as a function of a fresh air mass flow flowing through the compressor and a pressure ratio over the compressor.

33. The method according to claim 32, wherein, for determination of the pressure ratio over the compressor, a pressure in front of the compressor is determined from the atmospheric pressure, a measured fresh air mass flow and an atmospheric temperature, as well as a pressure after the compressor from a charge pressure, with which the fresh air is fed to the mixing site from the compressor, the measured fresh air mass flow and a charge temperature, with which the fresh air is fed to the mixing site from the compressor.

34. The method according to claim 33, wherein the fresh air mass flow flowing through the compressor is determined from the measured fresh air mass flow and the pressure in front of the compressor by means of a normalization, referred to the atmospheric temperature and a reference temperature of the compressor.

35. The method according to claim 26, wherein an exhaust gas temperature, after the turbine, is determined as a function of an exhaust gas temperature in front of the turbine, a temperature change over the turbine and a turbine efficiency.

36. The method according to claim 35, wherein the temperature change over the turbine is determined as a function of a pressure ratio over the turbine.

37. The method according to claim 35, wherein the efficiency of the turbine is determined as a function of a blade path of the turbine.

38. The method according to claim 35, wherein the exhaust gas temperature after the turbine is determined as follows, as a function of the exhaust gas temperature in front of the turbine, the temperature change over the turbine and the efficiency of the turbine:

$$T_{nT} = T_{vT} \cdot (1 - \Delta T_T \cdot \eta_T).$$

39. The method according to claim 26, wherein an exhaust gas counterpressure behind the turbine is derived from a pressure difference value that denotes the difference between the exhaust gas counterpressure behind the turbine and an atmospheric pressure.

40. The method according to claim 39, wherein the pressure difference value is determined as a function of exhaust gas mass flow through the turbine.

41. The method according to claim 40, wherein the pressure difference value is determined as a function of the exhaust gas mass flow through the turbine has been corrected by multiplication by means of a factor that corresponds to the square root of exhaust gas temperature after the turbine.

42. The method according to claim 39, wherein the exhaust gas counterpressure behind the turbine is determined by addition of the pressure difference value with the atmospheric pressure.

43. The method according to claim 42, wherein, by means of an exhaust gas counterpressure sensor, a pressure difference in the exhaust line behind the turbine is measured, in which the exhaust gas counterpressure behind the turbine is determined by addition of the pressure difference measured by the exhaust gas counterpressure sensor with a first-named pressure difference value and atmospheric pressure.

44. The method according to claim 26, wherein an exhaust gas counterpressure in front of the turbine is determined from an exhaust gas counterpressure after the turbine, an exhaust gas mass flow flowing through turbine, a blade path of the turbine and a speed of an exhaust gas turbo-supercharger shaft coupled to the turbine.

45. The method according to claim 44, wherein the exhaust gas counterpressure in front of the turbine is determined from the exhaust gas counterpressure after the turbine, the exhaust gas mass flow through the turbine, the blade path of the turbine and the speed of the exhaust gas turbo-supercharger shaft, as follows:

$p_{vT} = Z \cdot p_{nT}$ with $Z = b_0 + b_1 \cdot dm_T + b_2 \cdot (s-0,5)$ $+ b_3 \cdot s^2 + b_4 \cdot (n_{ATL} - 0,5)^2$ $+ b_5 \cdot (dm_T + 0,5) \cdot (s + 0,5)$ $+ b_6 \cdot (dm_T - 0,5) \cdot s^2$ $+ b_7 \cdot (s-1) \cdot (n_{ATL} - 0,5)^2$ $+ b_8 \cdot (s-1) \cdot (s-0,5)^2$ $+ b_9 \cdot (dm_T - 1)^2$ $+ b_{10} \cdot (dm_T - 1) \cdot (dm_T + 0,5)^2 \cdot dm_T$ $+ b_{11} \cdot [(dm_T - 1) \cdot (s - 0,5)^3 - 0,5] \cdot b_{12}$ $+ b_{13}$, in which $b_0 - b_{13}$ denotes coefficients.

46. The method according to claim 26, wherein an exhaust gas counterpressure of the exhaust recirculated via the exhaust gas recirculation is determined as a function of an exhaust gas recirculation mass flow flowing through the exhaust gas recirculation, an exhaust gas temperature in front of the turbine and an exhaust gas counterpressure of the exhaust ejected by the internal combustion engine in front of the turbine.

47. The method according to claim 46, wherein the exhaust gas counterpressure in the exhaust gas recirculation line is determined as follows as a function of exhaust gas counterpressure in front of the turbine, the exhaust gas recirculation mass flow in the exhaust gas recirculation line and the exhaust gas temperature in front of the turbine:

$$p_{AGR} = p_{vT} - \left(dm_{AGR}^2 \cdot T_{vT} \cdot \frac{PF}{p_{vT}}\right)$$

in which PF denotes an exhaust gas counterpressure constant.

48. The method according to claim 47, wherein the exhaust gas counterpressure constant is determined as a function of an effective cross sectional surface of the exhaust gas recirculation line.

49. The method according to claim 48, wherein the exhaust gas counterpressure constant is derived as follows from the gas constant and the effect of cross sectional surface of the exhaust gas recirculation line:

$$PF = \frac{R}{A_{eff}^2}.$$

50. A method for determination of the composition of the gas mixture in a combustion chamber of an internal combustion engine with exhaust gas recirculation, comprising the steps of:
mixing fresh air with the exhaust of an internal combustion engine wherein the exhaust is recirculated via the exhaust gas recirculation at a mixing site,
feeding the gas mixture resulting from the mixing to the combustion chamber of the internal combustion engine, and
simulating a behavior of a connection leading from the mixing site to the internal combustion engine, which supplies the combustion chamber of the internal combustion engine with the gas mixture from the mixing site wherein a fresh air mass and an exhaust gas mass in the connection is determined by time integration of the difference between a fresh air mass flow fed to the connection and a fresh air mass steam fed from the connection to the internal combustion engine or by time integration of a difference between an exhaust gas mass flow fed to the connection via the exhaust gas recirculation and an exhaust gas mass flow fed from the connection to the internal combustion engine, wherein the fresh air mass in the connection and the exhaust gas mass in the connection are determined as follows as a function of the fresh air mass flow fed to the connection, the exhaust gas mass flow fed to the connection, the fresh air mass steam fed from the connection to the internal combustion engine and the exhaust gas mass flow fed from the connection to the internal combustion engine:

$$m_L = \int_t^{t+T_0} (dm_L - dm_{Lmot})d\tau \text{ for } dm_{AGR} \geq 0$$

$$m_L = \int_t^{t+T_0} (dm_L - dm_{Lmot} + dm_{AGR}) \text{ for } dm_{AGR} < 0$$

and $$m_{AGR} = \int_t^{t+T_0} (dm_{AGR} - dm_{AGRmot})d\tau \text{ for } dm_{AGR} \geq 0$$

$$m_{AGR} = \int_t^{t+T_0} -dm_{AGRmot}d\tau \text{ for } dm_{AGR} < 0$$

in which t denotes an integration time and $T_0$ an integration interval.

51. The method according to claim 50, wherein the total gas mass in the connection is determined by addition of the fresh air mass in the connection and the exhaust gas mass in the connection.

52. The method according to claim 51, wherein the pressure prevailing in the connection is determined from the total gas mass in the connection, a temperature in the connection and a volume of the connection.

53. The method according to claim 51, wherein an exhaust gas recirculation rate is determined by relating the exhaust gas mass in the connection to the total gas mass in the connection.

54. The method according to claim 50, wherein the total gas mass in the connection is determined by addition of the fresh air mass in the connection and the exhaust gas mass in the connection.

55. The method according to claim 50, wherein a temperature of the gas mixture fed via the connection to the combustion chamber of the internal combustion engine is determined.

56. The method according to claim 55, wherein a fresh air mass and an exhaust gas mass in the connection is determined by time integration of the difference between a fresh air mass flow fed to the connection and a fresh air mass steam fed from the connection to the internal combustion engine or by time integration of a difference between an exhaust gas mass flow fed to the connection via the exhaust gas recirculation and an exhaust gas mass flow fed from the connection to the internal combustion engine, and wherein the temperature of the gas mixture fed via the connection to the combustion chamber of the internal combustion engine is determined as a function of the exhaust gas mass in the connection, a temperature of the exhaust gas recirculation mass flow fed via the exhaust gas recirculation, the fresh air mass in the connection and a temperature of the fresh air mass flow fed to the connection.

57. The method according to claim 56, wherein the temperature of the gas mixture in the connection is determined as follows as a function of the exhaust gas recirculation mass in the connection, the temperature of the exhaust gas recirculation mass flow, the fresh air mass in the connection and the temperature of the supplied fresh air mass flow:

$$T_{sr} = \frac{T_{AGR} \cdot m_{AGR} + T_{lad} \cdot m_L}{m_{AGR} + m_L} \text{ for } m_{AGR} + m_L \neq 0$$

and $$T_{sr} = T_{lad} \text{ for } m_{AGR} + m_L = 0.$$

58. The method according to claim 55, wherein the temperature of the gas mixture in the connection is corrected by an amount that depends on the difference between a wall temperature of the connection and the temperature of the gas mixture in the connection, as well as a factor multiplied by it, in which the factor again depends on the speed of the internal combustion engine and a fresh air mass flow fed via the connection to the combustion chamber of the internal combustion engine.

59. The method according to claim 58, wherein the wall temperature of the connection is derived from a cooling water temperature of the internal combustion engine and a wall heat factor of the connection.

60. A method for determination of the composition of the gas mixture in a combustion chamber of an internal combustion engine with exhaust gas recirculation, comprising the steps of:

mixing fresh air with the exhaust of an internal combustion engine recirculated via the exhaust gas recirculation and at a mixing site, feeding the gas mixture resulting from the mixing site to the combustion chamber of the internal combustion engine, and determining the composition of the gas mixture in the combustion chamber of the internal combustion engine by determination of corresponding state quantities of the internal combustion engine by using corresponding physically based models that simulate the behavior of the internal combustion engine with reference to the state quantity being determined, wherein the filling of the combustion chamber of the internal combustion engine is simulated with a model by the gas mixture fed from the mixing site, by the model, a total mass of the gas mixture in the combustion chamber of the internal combustion engine is determined as a function of the pressure and temperature of the gas mixture in front of the internal combustion engine, the total mass of the gas mixture in the combustion chamber of the internal combustion engine is determined by a linear approach as a function of the pressure and temperature of the gas mixture in front of the internal combustion engine, and during determination of the total mass as a function of the pressure and the temperature in front of the internal combustion engine, a correction factor is used in the linear approach for adaptation models to the actual behavior of internal combustion engine.

61. A method for determination of the composition of the gas mixture in a combustion chamber of an internal combustion engine with exhaust gas recirculation, comprising the steps of:

mixing fresh air with the exhaust of an internal combustion engine recirculated via the exhaust gas recirculation and at a mixing site, feeding the gas mixture resulting from the mixing site to the combustion chamber of the internal combustion engine, and determining the composition of the gas mixture in the combustion chamber of the internal combustion engine by determination of corresponding state quantities of the internal combustion engine by using corresponding physically based models that simulate a behavior of the internal combustion engine with reference to the state quantity being determined, wherein by a physically based model, the behavior of an exhaust line of the internal combustion engine, before and after a turbine connected to the internal combustion engine, is simulated, by a model, a speed of an exhaust gas turbo-supercharger shaft connected to the turbine and a compressor connected to the internal combustion engine are determined as a function of a fresh air mass flow flowing through the compressor and a pressure ratio over the compressor, and for determination of the pressure ratio over the compressor, a pressure in front of the compressor is determined from the atmospheric pressure, a measured fresh air mass flow and an atmospheric temperature, as well as a pressure after the compressor from a charge pressure, with which the fresh air is fed to the mixing site from the compressor, the measured fresh air mass flow and a charge temperature, with which the fresh air is fed to the mixing site from the compressor.

62. A method for determination of the composition of the gas mixture in a combustion chamber of an internal combustion engine with exhaust gas recirculation, comprising the steps of:

mixing fresh air with the exhaust of an internal combustion engine recirculated via the exhaust gas recirculation and at a mixing site, feeding the gas mixture resulting from the mixing site to the combustion chamber of the internal combustion engine, and determining the composition of the gas mixture in the combustion chamber of the internal combustion engine by determination of corresponding state quantities of the internal combustion engine by using corresponding physically based models that simulate a behavior of the internal combustion engine with reference to the state quantity being determined, wherein, by a physically based model, the behavior of an exhaust line of the internal combustion engine, before and after a turbine connected to the internal combustion engine, is simulated, an exhaust gas counterpressure behind the turbine is derived by a model from a pressure difference value that denotes the difference between the exhaust gas counterpressure behind the turbine and an atmospheric pressure, the pressure difference value is determined as a function of exhaust gas mass flow through turbine, and the pressure difference value is determined as a function of the exhaust gas mass flow through the turbine which has been corrected by multiplication by a factor that corresponds to the square root of exhaust gas temperature after turbine.

63. A method for determination of the composition of the gas mixture in a combustion chamber of an internal combustion engine with exhaust gas recirculation, comprising the steps of:

mixing fresh air with the exhaust of an internal combustion engine recirculated via the exhaust gas recirculation and at a mixing site, feeding the gas mixture resulting from the mixing site to the combustion chamber of the internal combustion engine, and determining the composition of the gas mixture in the combustion chamber of the internal combustion engine by determination of corresponding state quantities of the internal combustion engine by using corresponding physically based models that simulate a behavior of the internal combustion engine with reference to the state quantity being determined, wherein by a physically based model, the behavior of an exhaust line of the internal combustion engine, before and after a turbine connected to the internal combustion engine, is simulated, an exhaust gas counterpressure in front of the turbine is determined from an exhaust gas counterpressure after the turbine, an exhaust gas mass flow flowing through the turbine, a blade path of the turbine and a speed of an exhaust gas turbo-supercharger shaft coupled to the turbine, and the exhaust gas counterpressure in front of the turbine is determined from the exhaust gas counterpressure after the turbine, the exhaust gas mass flow through the turbine, the blade path of the turbine and the speed of the exhaust gas turbo-supercharger shaft, as follows:

$p_{vT} = Z \cdot p_{nT}$ with $Z = b_0 + b_1 \cdot dm_T + b_2 \cdot (s-0,5)$ $+ b_3 \cdot s^2 + b_4 \cdot (n_{ATL} - 0,5)^2$ $+ b_5 \cdot (dm_T + 0,5) \cdot (s+0,5)$ $+ b_6 \cdot (dm_T - 0,5) \cdot s^2$ $+ b_7 \cdot (s-1) \cdot (n_{ATL} - 0,5)^2$ $+ b_8 \cdot (s-1) \cdot (s-0,5)^2$ $+ b_9 \cdot (dm_T - 1)^2$ $+ b_{10} \cdot (dm_T - 1) \cdot (dm_T + 0,5)^2 \cdot dm_T$ $+ b_{11} \cdot [(dm_T - 1) \cdot (s-0,5)^3 - 0,5] \cdot b_{12}$ $+ b_{13}$, in which $b_0$–$b_{13}$ denotes coefficients.

64. A method for determination of the composition of the gas mixture in a combustion chamber of an internal combustion engine with exhaust gas recirculation, comprising the steps of:
  mixing fresh air with the exhaust of an internal combustion engine recirculated via the exhaust gas recirculation and at a mixing site,
  feeding the gas mixture resulting from the mixing site to the combustion chamber of the internal combustion engine, and
  determining the composition of the gas mixture in the combustion chamber of the internal combustion engine by determination of corresponding state quantities of the internal combustion engine by using corresponding physically based models that simulate a behavior of the internal combustion engine with reference to the state quantity being determined,
wherein
  by a physically based model, the behavior of an exhaust line of the internal combustion engine, before and after a turbine connected to the internal combustion engine, is simulated,
  by a model, an exhaust gas counterpressure of the exhaust recirculated via the exhaust gas recirculation is determined as a function of an exhaust gas recirculation mass flow flowing through the exhaust gas recirculation, an exhaust gas temperature in front of the turbine and an exhaust gas counterpressure of the exhaust ejected by the internal combustion engine in front of the turbine.

65. A method for determination of the composition of the gas mixture in a combustion chamber of an internal combustion engine with exhaust gas recirculation, comprising the steps of:
  mixing fresh air with the exhaust of an internal combustion engine recirculated via the exhaust gas recirculation and at a mixing site,
  feeding the gas mixture resulting from the mixing site to the combustion chamber of the internal combustion engine, and
  determining the composition of the gas mixture in the combustion chamber of the internal combustion engine by determination of corresponding state quantities of the internal combustion engine by using corresponding physically based models that simulate a behavior of the internal combustion engine with reference to the state quantity being determined
wherein
  by a model, the behavior of a connection leading from mixing site to the internal combustion engine, which supplies the combustion chamber of internal combustion engine with the gas mixture from mixing site, is simulated,
  by a model, a temperature of the gas mixture fed via the connection to the combustion chamber of internal combustion engine is determined,
  a fresh air mass and an exhaust gas mass in the connection is determined by time integration of the difference between a fresh air mass flow fed to the connection and a fresh air mass steam fed from the connection to the internal combustion engine or by time integration of a difference between an exhaust gas mass flow fed to the connection via the exhaust gas recirculation and an exhaust gas mass flow fed from the connection to the internal combustion engine, and wherein, by a model, the temperature of the gas mixture fed via the connection to the combustion chamber of internal combustion engine is determined as a function of the exhaust gas mass in the connection, a temperature of the exhaust gas recirculation mass flow fed via the exhaust gas recirculation, the fresh air mass in the connection and a temperature of the fresh air mass flow fed to the connection, and
  the temperature of the gas mixture in the connection is determined as follows as a function of the exhaust gas recirculation mass in the connection, the temperature of the exhaust gas recirculation mass flow, the fresh air mass in the connection and the temperature of the supplied fresh air mass flow:

$$T_{sr} = \frac{T_{AGR} \cdot m_{AGR} + T_{lad} \cdot m_L}{m_{AGR} + m_L} \text{ for } m_{AGR} + m_L \neq 0$$

and $$T_{sr} = T_{lad} \text{ for } m_{AGR} + m_L = 0.$$

66. A control system for an internal combustion engine with exhaust gas recirculation, comprising:
  means for mixing fresh air with an exhaust of the internal combustion engine at a mixing site,
  an exhaust gas recirculation for recirculating the exhaust, and
  means for feeding a resulting gas mixture to a combustion chamber of internal combustion engine,
  wherein the control system automatically determines the filling of the combustion chamber of the internal combustion engine by simulation which determines a total mass of the gas mixture in the combustion chamber of the internal combustion engine as a function of the pressure and temperature of the gas mixture in front of the internal combustion engine using coefficients that are dependent on the speed of the internal combustion engine wherein the coefficients are determined by quadratic polynomials as a function of the speed of the internal combustion engine.

67. A control system for an internal combustion engine with exhaust gas recirculation, comprising:
  means for mixing fresh air with an exhaust of the internal combustion engine at a mixing site, an exhaust gas recirculation for recirculating the exhaust, and means for feeding a resulting gas mixture to a combustion chamber of internal combustion engine, wherein the control system controls the internal combustion engine to:

mix fresh air with the exhaust of an internal combustion engine recirculated via the exhaust gas recirculation and at the mixing site, feed the gas mixture resulting from the mixing site to the combustion chamber of the internal combustion engine, and determines the composition of the gas mixture in the combustion chamber of the internal combustion engine by determination of corresponding state quantities of the internal combustion engine by using corresponding physically based models that simulate the behavior of the internal combustion engine with reference to the state quantity being determined, further comprising a physically based model, which simulates the behavior of an exhaust line of the internal combustion engine, before and after a turbine connected to the internal combustion engine, and model means, which determine a speed of an exhaust gas turbo-supercharger shaft connected to the turbine and a compressor connected to the internal combustion engine as a function of a fresh air mass flow flowing through the compressor and a pressure ratio over the compressor, and wherein the control system for determination of the pressure ratio over the compressor, determines a pressure in front of the compressor from the atmospheric pressure, a measured fresh air mass flow and an atmospheric temperature, as well as a pressure after the compressor from a charge pressure, with which the fresh air is fed to the mixing site from the compressor, the measured fresh air mass flow and a charge temperature, with which the fresh air is fed to the mixing site from the compressor.

68. A control system for an internal combustion engine with exhaust gas recirculation, comprising:

means for mixing fresh air with an exhaust of the internal combustion engine at a mixing site, an exhaust gas recirculation for recirculating the exhaust, and means for feeding a resulting gas mixture to a combustion chamber of internal combustion engine, wherein the control system controls the internal combustion engine to:

mix fresh air with the exhaust of an internal combustion engine recirculated via the exhaust gas recirculation and at a mixing site, feed the gas mixture resulting from the mixing site to the combustion chamber of the internal combustion engine, and determines the composition of the gas mixture in the combustion chamber of the internal combustion engine by determination of corresponding state quantities of the internal combustion engine by using corresponding physically based models that simulate the behavior of the internal combustion engine with reference to the state quantity being determined, wherein by a physically based model, the behavior of an exhaust line of the internal combustion engine, before and after a turbine connected to the internal combustion engine, is simulated, by a model, a speed of an exhaust gas turbo-supercharger shaft connected to the turbine and a compressor connected to the internal combustion engine are determined as a function of a fresh air mass flow flowing through the compressor and a pressure ratio over the compressor, and for determination of the pressure ratio over the compressor, a pressure in front of the compressor is determined from the atmospheric pressure, a measured fresh air mass flow and an atmospheric temperature, as well as a pressure after the compressor from a charge pressure, with which the fresh air is fed to the mixing site from the compressor, the measured fresh air mass flow and a charge temperature, with which the fresh air is fed to the mixing site from the compressor.

69. A control system for an internal combustion engine with exhaust gas recirculation, comprising:

means for mixing fresh air with an exhaust of the internal combustion engine at a mixing site, an exhaust gas recirculation for recirculating the exhaust, and means for feeding a resulting gas mixture to a combustion chamber of internal combustion engine, wherein the control system controls the internal combustion engine to mix fresh air with the exhaust of an internal combustion engine recirculated via the exhaust gas recirculation and at a mixing site, feed the gas mixture resulting from the mixing site to the combustion chamber of the internal combustion engine, and determines the composition of the gas mixture in the combustion chamber of the internal combustion engine by determination of corresponding state quantities of the internal combustion engine by using corresponding physically based models that simulate a behavior of the internal combustion engine with reference to the state quantity being determined, wherein by a physically based model, the behavior of an exhaust line of the internal combustion engine, before and after a turbine connected to the internal combustion engine, is simulated, derives an exhaust gas counterpressure behind the turbine by a model from a pressure difference value that denotes the difference between the exhaust gas counterpressure behind the turbine and an atmospheric pressure, determines the pressure difference value as a function of exhaust gas mass flow through turbine, and determines the pressure difference value as a function of the exhaust gas mass flow through the turbine which has been corrected by multiplication by a factor that corresponds to the square root of exhaust gas temperature after turbine.

70. A control system for an internal combustion engine with exhaust gas recirculation, comprising:

means for mixing fresh air with an exhaust of the internal combustion engine at a mixing site, an exhaust gas recirculation for recirculating the exhaust, and means for feeding a resulting gas mixture to a combustion chamber of internal combustion engine, wherein the control system controls the internal combustion engine to:

mix fresh air with the exhaust of an internal combustion engine recirculated via the exhaust gas recirculation and at a mixing site, feed the gas mixture resulting from the mixing site to the combustion chamber of the internal combustion engine, and determines the composition of the gas mixture in the combustion chamber of the internal combustion engine by determination of corresponding state quantities of the internal combustion engine by using corresponding physically based models that simulate the behavior of the internal combustion engine with reference to the state quantity being determined, wherein by a physically based model, the behavior of an exhaust line of the internal combustion engine, before and after a turbine connected to the internal combustion engine, is simulated, an exhaust gas counterpressure in front of the turbine is determined from an exhaust gas counterpressure after the turbine, an exhaust gas mass flow flowing through the turbine, a blade path of the turbine and a speed of an exhaust gas turbo-supercharger shaft coupled to the turbine, and the exhaust gas counterpressure in front of the turbine is determined from the exhaust gas counterpressure after the turbine, the exhaust gas mass flow through the turbine, the blade path of the turbine and the speed of the exhaust gas turbo-supercharger shaft, as follows:

$p_{vT} = Z \cdot p_{nT}$ with $Z = b_0 + b_1 \cdot dm_T + b_2 \cdot (s-0,5)$ $+ b_3 \cdot s^2 + b_4 \cdot (n_{ATL} - 0,5)^2$ $+ b_5 \cdot (dm_T + 0,5) \cdot (s+0,5)$ $+ b_6 \cdot (dm_T - 0,5) \cdot s^2$ $+ b_7 \cdot (s-1) \cdot (n_{ATL} - 0,5)^2$ $+ b_8 \cdot (s-1) \cdot (s-0,5)^2$ $+ b_9 \cdot (dm_T - 1)^2$ $+ b_{10} \cdot (dm_T - 1) \cdot (dm_T + 0,5)^2 \cdot dm_T$ $+ b_{11} \cdot [(dm_T - 1) \cdot (s-0,5)^3 - 0,5] \cdot b_{12}$ $+ b_{13}$, in which $b_0 - b_{13}$ denotes coefficients.

71. A control system for an internal combustion engine with exhaust gas recirculation, comprising:

means for mixing fresh air with an exhaust of the internal combustion engine at a mixing site, an exhaust gas recirculation for recirculating the exhaust, and means for feeding a resulting gas mixture to a combustion chamber of internal combustion engine, wherein the control system controls the internal combustion engine to:

mix fresh air with the exhaust of an internal combustion engine recirculated via the exhaust gas recirculation and at a mixing site, feed the gas mixture resulting from the mixing site to the combustion chamber of the internal combustion engine, and determines the composition of the gas mixture in the combustion chamber of the internal combustion engine by determination of corresponding state quantities of the internal combustion engine by using corresponding physically based models that simulate the behavior of the internal combustion engine with reference to the state quantity being determined, wherein by a physically based model, the behavior of an exhaust line of the internal combustion engine, before and after a turbine connected to the internal combustion engine, is simulated, by a model, an exhaust gas counterpressure of the exhaust recirculated via the exhaust gas recirculation is determined as a function of an exhaust gas recirculation mass flow flowing through the exhaust gas recirculation, an exhaust gas temperature in front of the turbine and an exhaust gas counterpressure of the exhaust ejected by the internal combustion engine in front of the turbine.

72. A control system for an internal combustion engine with exhaust gas recirculation, comprising:

means for mixing fresh air with an exhaust of the internal combustion engine at a mixing site, an exhaust gas recirculation for recirculating the exhaust, and means for feeding a resulting gas mixture to a combustion chamber of internal combustion engine, wherein the control system controls the internal combustion engine to:

mix fresh air with the exhaust of an internal combustion engine recirculated via the exhaust gas recirculation and at a mixing site, feed the gas mixture resulting from the mixing site to the combustion chamber of the internal combustion engine, and determines the composition of the gas mixture in the combustion chamber of the internal combustion engine by determination of corresponding state quantities of the internal combustion engine by using corresponding physically based models that simulate the behavior of the internal combustion engine with reference to the state quantity being determined wherein by a model, the behavior of a connection leading from mixing site to the internal combustion engine, which supplies the combustion chamber of internal combustion engine with the gas mixture from mixing site, is simulated, by a model, a temperature of the gas mixture fed via the connection to the combustion chamber of internal combustion engine is determined, a fresh air mass and an exhaust gas mass in the connection is determined by time integration of the difference between a fresh air mass flow fed to the connection and a fresh air mass steam fed from the connection to the internal combustion engine or by time integration of a difference between an exhaust gas mass flow fed to the connection via the exhaust gas recirculation and an exhaust gas mass flow fed from the connection to the internal combustion engine, and wherein, by a model, the temperature of the gas mixture fed via the connection to the combustion chamber of internal combustion engine is determined as a function of the exhaust gas mass in the connection, a temperature of the exhaust gas recirculation mass flow fed via the exhaust gas recirculation, the fresh air mass in the connection and a temperature of the fresh air mass flow fed to the connection, and the temperature of the gas mixture in the connection is determined as follows as a function of the exhaust gas recirculation mass in the connection, the temperature of the exhaust gas recirculation mass flow, the fresh air mass in the connection and the temperature of the supplied fresh air mass flow:

$$T_{sr} = \frac{T_{AGR} \cdot m_{AGR} + T_{lad} \cdot m_L}{m_{AGR} + m_L} \text{ for } m_{AGR} + m_L \neq 0$$

and $$T_{sr} = T_{lad} \text{ for } m_{AGR} + m_L = 0.$$

* * * * *